US007254826B2

(12) United States Patent
Mori

(10) Patent No.: US 7,254,826 B2
(45) Date of Patent: Aug. 7, 2007

(54) BROADCAST APPARATUS AND RECEPTION APPARATUS THAT ENABLE ADDITIONAL DATA TO BE USED WITHOUT A WAITING TIME WHEN ONE PROGRAM CHANGES TO ANOTHER

(75) Inventor: Toshiya Mori, Settsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1053 days.

(21) Appl. No.: 09/897,222

(22) Filed: Jul. 2, 2001

(65) Prior Publication Data

US 2003/0005458 A1 Jan. 2, 2003

(30) Foreign Application Priority Data

Jun. 30, 2000 (JP) ............................ 2000-199552

(51) Int. Cl.
*H04N 7/173* (2006.01)

(52) U.S. Cl. ...................... 725/114; 725/134; 725/142; 725/144

(58) Field of Classification Search .................. 725/91, 725/92, 95, 32, 36, 42, 114–118, 134, 142, 725/132, 144–148
See application file for complete search history.

(56) References Cited

U.S. PATENT DOCUMENTS

| | | | | |
|---|---|---|---|---|
| 5,440,334 | A * | 8/1995 | Walters et al. | 725/92 |
| 6,157,948 | A * | 12/2000 | Inoue et al. | 709/219 |
| 6,191,782 | B1 * | 2/2001 | Mori et al. | 725/37 |
| 6,615,039 | B1 * | 9/2003 | Eldering | 455/418 |
| 6,698,020 | B1 * | 2/2004 | Zigmond et al. | 725/34 |
| 2001/0034787 | A1 * | 10/2001 | Takao et al. | 709/231 |
| 2002/0010937 | A1 * | 1/2002 | Hirai et al. | 725/91 |

FOREIGN PATENT DOCUMENTS

| | | |
|---|---|---|
| EP | 827340 | 3/1998 |
| GB | 2272618 | 5/1992 |
| JP | 5252123 | 9/1993 |
| JP | 6296267 | 10/1994 |
| JP | 10126753 | 5/1998 |

* cited by examiner

*Primary Examiner*—Ngoc Vu

(57) ABSTRACT

A broadcast apparatus broadcasts broadcast data. In the broadcast apparatus, an acquiring unit acquires broadcast data and a reproduction time period in which the broadcast data is to be reproduced by a reception apparatus, and a broadcasting unit repeatedly broadcasts the broadcast data from a predetermined time period before a start of the reproduction time period to an end of the reproduction time period.

52 Claims, 9 Drawing Sheets

FIG. 2

| BROADCAST DATE | CHANNEL CODE | BROADCAST START TIME | BROADCAST END TIME | PROGRAM MANAGEMENT CODE | PROGRAM TITLE | ADDITIONAL DATA MANAGEMENT CODE | ADDITIONAL DATA TITLE | |
|---|---|---|---|---|---|---|---|---|
| 2000/ 5/1 | 10 | 6 : 00 : 00 | 6 : 00 : 30 | C1001 | CM A | CA1001 | CMA A | 201 |
| | | 6 : 00 : 30 | 6 : 01 : 00 | C1002 | CM B | CA1002 | CMA B | 202 |
| | | 6 : 01 : 00 | 6 : 02 : 00 | C1007 | CM G | CA1007 | CMA G | |
| | | 6 : 02 : 00 | 6 : 13 : 00 | M1001-1 | MP A-1 | MA1001 | MPA A | 207 |
| | | 6 : 13 : 00 | 6 : 13 : 30 | C1001 | CM A | CA1001 | CMA A | 203 |
| | | 6 : 13 : 30 | 6 : 14 : 00 | C1002 | CM B | CA1002 | CMA B | 204 |
| | | 6 : 14 : 00 | 6 : 15 : 00 | C1008 | CM H | CA1008 | CMA H | |
| | | 6 : 15 : 00 | 6 : 28 : 00 | M1001-2 | MP A-2 | MA1001 | MPA A | 208 |
| | | 6 : 28 : 00 | 6 : 28 : 30 | C1001 | CM A | CA1001 | CMA A | 205 |
| | | 6 : 28 : 30 | 6 : 29 : 00 | C1002 | CM B | CA1002 | CMA B | 206 |
| | | 6 : 29 : 00 | 6 : 30 : 00 | C1006 | CM F | CA1006 | CMA F | |
| | | ⋮ | ⋮ | ⋮ | ⋮ | ⋮ | ⋮ | |
| | 11 | 6 : 00 : 00 | 6 : 00 : 15 | C1003 | CM C | CA1003 | CMA C | |
| | | ⋮ | ⋮ | ⋮ | ⋮ | ⋮ | ⋮ | |

```
<repeat transmission id= "repeat transmission data 1" start_time= "6:12:40" duration= "0:00:20"
 <module id= "module 1" >
   <private_data= "10th ANNIVERSARY SALE ON MAY 6 PRESENTS FOR FIRST 1000 CUSTOMERS" >
 </module>
</repeat transmission>

        .
        .
        .

<manual generating>
  <event_msg id= "event message 1"
            handler=proc1(module 1);/>
  <event_msg id= "event message 2"
            handler=proc2(module 1);/>
  <event_msg id= "event message 3"
            handler=proc1(module 2);/>
</manual generating>

        .
        .
        .
```

```
601 ┌ <repeat transmission id= "repeat transmission data 1" start_time= "6:12:40" duration= "0:00:20"
    │ 602 ┌ <module id= "module 1" >
    │     │   <private_data= "10th ANNIVERSARY SALE ON MAY 6 PRESENTS FOR FIRST 1000 CUSTOMERS" >
    │     └ </module>
    │ 603 ┌ </module id= "module 2" >
    │     │   <private_data= "NEW SONG RELEASE MAY 21" >
    │     └ </module>
    └ </repeat transmission>

          .
          .
          .

<manual generating>
604 ┌ <event_msg id= "event message 2"
    └             handler=proc2(module 1):/>
605 ┌ <event_msg id= "event message 3"
    └             handler=proc1(module 2):/>
606 ┌ <event_msg id= "event message 4"
    └             handler=proc2(module 2):/>
</manual generating>

          .
          .
          .
```

```
<repeat transmission id="repeat transmission data 1" start_time="6:12:40" duration="0:00:20">
    <module id="module 4">
        <private_data="The third deadline is May 10. Enter the price competition.">
    </module>
</repeat transmission>
```
702 (within 701)

```
<manual generating>
    <event_msg id="event message 8"
        handler=proc2(module 4);/>
</manual generating>
```
703

BROADCAST APPARATUS AND RECEPTION APPARATUS THAT ENABLE ADDITIONAL DATA TO BE USED WITHOUT A WAITING TIME WHEN ONE PROGRAM CHANGES TO ANOTHER

BACKGROUND OF THE INVENTION (1) Field of the Invention

The present invention relates to a broadcast apparatus, a reception apparatus, and a data transmission/reception method, and especially relates to techniques of multiplex, transmission, and reception of data to be simultaneously displayed.

(2) Prior Art

In recent digital broadcasting, additional data such as character information is multiplexed with program data such as video and audio and broadcast.

In general, the same or update additional data is repeatedly multiplexed with program data and broadcast, in a predetermined cycle such as five seconds.

After a viewer's start operation, a reception apparatus keeps the viewer waiting while the reception apparatus waits for necessary additional data for one or two cycles, processes it, and displays it.

Also, in a virtual interactive system in which a viewer repeatedly select items from displayed menus to search for necessary information, they have to wait in every selection operation.

A reception apparatus that provides desired information to a viewer shortly after the viewer's selection operation is disclosed in Japanese Laid-Open Patent Application No. H10-126753.

This reception apparatus receives navigation information which associates a plurality of pieces of image information with each other, and accumulates a piece of image information to be displayed next in a memory in advance. Accordingly, the reception apparatus intends to reduce a waiting time from the viewer's selection operation to the display of the desired image.

Here, if additional data to be multiplexed with program data is different for each program like characters or detailed information about a program, which are to be displayed simultaneously with an image of the program, additional data changes when one program changes to another. Therefore, a viewer has to wait until the reception apparatus starts to display additional data whenever one program changes to another.

Suppose there is a waiting time of seven seconds. The waiting time of seven seconds is not so problematic for a relatively long program of thirty minutes or one hour. However, the shorter a broadcast time period of a program becomes, the greater the influence with the waiting time becomes. Especially, a broadcast time period of a commercial (CM) is generally no longer than thirty seconds. In addition, a CM program has to meet a lot of requirements from its sponsor. Therefore, it is problematic if characters are not displayed even for a few seconds.

Note here that conventional reception apparatuses are not designed to handle such a problem caused when one program changes to another.

SUMMARY OF THE INVENTION

The object of the present invention is to provide, for digital broadcasting in that additional data corresponding to each program is multiplexed with program data and broadcast, (a) a broadcast apparatus for multiplexing and broadcasting such additional data with program data so as to enable a reception apparatus to use the additional data without a waiting time when one program changes to another, (b) a reception apparatus for using the additional data without a waiting time when one program changes to another, and (c) methods of them.

The object is achieved by a broadcast apparatus for broadcasting broadcast data including: an acquiring unit for acquiring first broadcast data and a reproduction time period in which the first broadcast data is to be reproduced by a reception apparatus; and a broadcasting unit for repeatedly broadcasting the first broadcast data from a specific time to an end of the reproduction time period, the specific time being a point in time before a start of the reproduction time period, and a time period between the specific time and the start of the reproduction time period being a predetermined time period.

With this construction, the broadcast apparatus can start to broadcast the first broadcast data before the start of the reproduction time period. Then, the reception apparatus can receive and cache the first broadcast data before the start of the reproduction time period.

Accordingly, the reception apparatus can start to reproduce the first broadcast data at the start of the reproduction time period.

Also, the broadcast apparatus can continue to broadcast the first broadcast data until the end of the reproduction time period. Accordingly, even when starting to receive the first broadcast data after the start of the reproduction time period, the reception apparatus can receive and reproduce it.

Here, in the broadcast apparatus, the acquiring unit may further acquire second broadcast data which is to be reproduced before the first broadcast data, and the broadcasting unit may repeatedly broadcast the second broadcast data until the specific time.

With this construction, the broadcast apparatus can stop broadcasting the second broadcast data which is to be reproduced before the first broadcast data at the specific time. Accordingly, a given bandwidth can be allocated only for the first broadcast data broadcasting.

Here, in the broadcast apparatus, the broadcasting unit may broadcast the second broadcast data on a predetermined bandwidth until the specific time and may broadcast the first broadcast data on the predetermined bandwidth from the specific time.

With this construction, the first broadcast data can be broadcast on the same bandwidth as the second broadcast data. Accordingly, the bandwidth can be fixed even around the specific time.

Here, in the broadcast apparatus, the acquiring unit may further acquire second broadcast data which is to be reproduced before the first broadcast data, and the broadcasting unit may repeatedly broadcast the second broadcast data until the start of the reproduction time period.

With this construction, the broadcast apparatus can continue to broadcast the second broadcast data until the start of the reproduction time period.

Accordingly, both of the second broadcast data and the first broadcast data can be broadcast from the specific time to the start of the reproduction time period, so that the first broadcast data can be broadcast from the point of the predetermined time period before the start of the reproduction time period without any influence on the second broadcast data broadcasting.

Here, in the broadcast apparatus, the broadcasting unit may broadcast the second broadcast data on a predetermined bandwidth until the specific time and may broadcast the second broadcast data and the first broadcast data on the predetermined bandwidth from the specific time to the start of the reproduction period.

With this construction, the second broadcast data and the first broadcast data can be broadcast from the specific time on the same bandwidth which is allocated for the second broadcast data until the specific time. Accordingly, the bandwidth can be fixed even around the specific time.

Here, in the broadcast apparatus, the broadcasting unit may broadcast the second broadcast data on a predetermined bandwidth until the specific time and may broadcast the second broadcast data on the predetermined bandwidth from the specific time to the start of the reproduction period.

With this construction, the second broadcast data can be broadcast from the specific time on the same bandwidth allocated for the second broadcast data until the specific time. Accordingly, the bandwidth can be fixed even around the specific time.

Here, the broadcast apparatus may further include: a cache instruction broadcasting unit for broadcasting a cache instruction before the start of the reproduction time period, the cache instruction instructing the reception apparatus to cache the first broadcast data; and a reproduction instruction broadcasting unit for broadcasting a reproduction instruction during the reproduction time period, the reproduction instruction instructing the reception apparatus to reproduce, when the first broadcast data has been cached according to the cache instruction, the cached broadcast data.

With this construction, the broadcast apparatus can instruct to cache the first broadcast data before the start of the reproduction time period and instruct to reproduce it during the reproduction time period. Accordingly, the reception apparatus can effectively cache and reproduce the first broadcast data according to the instructions.

Here, in the broadcast apparatus, the cache instruction broadcasting unit may broadcast the cache instruction to instruct the reception apparatus to perform the caching by accumulating the first broadcast data, and the reproduction instruction broadcasting unit may broadcast the reproduction instruction to instruct the reception apparatus to reproduce, (a) when the first broadcast data has been accumulated according to the cache instruction, the accumulated broadcast data, and (b) when the first broadcast data has not been accumulated according to the cache instruction, the first broadcast data broadcast by the broadcasting unit.

With this construction, the broadcast apparatus can instruct to accumulate the first broadcast data, which is broadcast, before the start of the reproduction time period and instruct to reproduce it during the reproduction time period. Accordingly, the reception apparatus can effectively accumulate and reproduce the first broadcast data according to the instructions.

Here, in the broadcast apparatus, the cache instruction broadcasting unit may broadcast the cache instruction to instruct the reception apparatus to perform the caching by storing the first broadcast data into a cache memory when the first broadcast data has been stored in a predetermined storage medium, and the reproduction instruction broadcasting unit may broadcast the reproduction instruction to instruct the reception apparatus to reproduce, (a) when the first broadcast data has been stored in the cache memory according to the cache instruction, the first broadcast data stored in the cache memory, and (b) when the first broadcast data has not been stored in the cache memory according to the cache instruction, the first broadcast data stored in the predetermined storage medium or the first broadcast data broadcast by the broadcasting unit.

With this construction, the broadcast apparatus can instruct to cache the first broadcast data, which is stored in the predetermined storage medium, into the cache memory before the start of the reproduction time period and instruct to reproduce it during the reproduction time period. Accordingly, the reception apparatus can effectively cache the first broadcast data into the cache memory and reproduce it according to the instructions.

The object of the present invention also can be achieved by a broadcast apparatus for multiplexing and broadcasting program data which is to be reproduced by a reception apparatus soon after receipt and additional data which corresponds to the program data, the broadcast apparatus including: an acquiring unit for acquiring first program data, first additional data corresponding to the first program data, a broadcast time period of the first program data, and second program data which is to be broadcast before the first program data; a multiplexing unit for repeatedly multiplexing the first additional data with the second program data from a specific time to a start of the broadcast time period and repeatedly multiplexing the first additional data with the first program data during the broadcast time period, the specific time being a point in time before the start of the broadcast time period, and a time period between the specific time and the start of the broadcast time period being a predetermined time period; and a broadcasting unit for broadcasting the data multiplexed by the multiplexing unit.

With this construction, the broadcast apparatus can multiplex the first additional data corresponding to the first program data with the second program data, which is to be broadcast before the first program data, and broadcast them, before the start of the broadcast time period of the first program data. Then, the reception apparatus can receive and cache the first additional data before the start of the broadcast time period.

Accordingly, the reception apparatus can start to use the first additional data at the start of the broadcast time period.

Also, the broadcast apparatus can continue to multiplex the first additional data with the first program data and broadcast them until the end of the broadcast time period. Therefore, even when starting to receive them after the start of the broadcast time period, the reception apparatus can receive and use the first additional data.

Here, in the broadcast apparatus, the acquiring unit may further acquire second additional data corresponding to the second program data, and the multiplexing unit may repeatedly multiplex the second additional data with the second program data until the specific time.

With this construction, the broadcast apparatus can stop multiplexing the second additional data with its corresponding second program data at the specific time. Accordingly, a given bandwidth can be allocated only for the first additional data broadcasting.

Here, in the broadcast apparatus, the multiplexing unit may perform the multiplexing for the second additional data on a predetermined bandwidth until the specific time and may perform the multiplexing for the first additional data on the predetermined bandwidth from the specific time.

With this construction, the broadcast apparatus can multiplex the first additional data with the second program data so that the bandwidth for the first additional data is allocated to the same bandwidth as the second additional data. Accordingly, the bandwidth can be fixed even around the specific time.

Here, in the broadcast apparatus, the acquiring unit may further acquire second additional data corresponding to the second program data, and the multiplexing unit may repeatedly multiplex the second additional data with the second program data until the start of the broadcast time period.

With this construction, the broadcast apparatus can continue to multiplex the second additional data with its corresponding second program data until the start of the broadcast time period of the first program data.

Accordingly, both of the second additional data and the first additional data can be multiplexed with the second program data from the specific time to the start of the broadcast time period of the first program data, so that the first additional data can be broadcast from the point of the predetermined time period before the start of the broadcast time period without any influence on the second additional data broadcasting.

Here, in the broadcast apparatus, the multiplexing unit may perform the multiplexing for the second additional data on a predetermined bandwidth until the specific time and may perform the multiplexing for the second additional data and the first additional data on the predetermined bandwidth from the specific time to the start of the broadcast time period.

With this construction, the second additional data and the first additional data can be multiplexed with the second program data from the specific time so that the total bandwidth for the second additional data and the first additional data is allocated to the same bandwidth which is allocated for the second additional data until the specific time. Accordingly, the bandwidth can be fixed even around the specific time.

Here, in the broadcast apparatus, the multiplexing unit may perform the multiplexing for the second additional data on a predetermined bandwidth until the specific time and may perform the multiplexing for the second additional data on the predetermined bandwidth from the specific time to the start of the broadcast time period.

With this construction, the second additional data can be multiplexed with the second program data from the specific time on the same bandwidth which is allocated until the specific time. Accordingly, the bandwidth can be fixed even around the specific time.

Here, the broadcast apparatus may further include: a cache instruction broadcasting unit for broadcasting a cache instruction before the start of the broadcast time period, the cache instruction instructing the reception apparatus to cache the first additional data; and a use instruction broadcasting unit for broadcasting a use instruction after the start of the broadcast time period, the use instruction instructing the reception apparatus to use, when the first additional data is cached according to the cache instruction, the cached additional data.

With this construction, the broadcast apparatus can instruct to cache the first additional data before the start of the broadcast time period and instruct to use it during the broadcast time period. Accordingly, the reception apparatus can effectively cache and use the first additional data according to the instructions.

Here, in the broadcast apparatus, the cache instruction broadcasting unit may broadcast the cache instruction to instruct the reception apparatus to perform the caching by accumulating the first additional data, and the use instruction broadcasting unit may broadcast the use instruction to instruct the reception apparatus to use, (a) when the first additional data has been accumulated according to the cache instruction, the accumulated first additional data, and (b) when the first additional data has not been accumulated according to the cache instruction, the first additional data broadcast by the broadcasting unit.

With this construction, the broadcast apparatus can instruct to accumulate the first additional data before the start of the broadcast time period and instruct to use it during the broadcast time period. Accordingly, the reception apparatus can effectively accumulate and use the first additional data according to the instructions.

Here, in the broadcast apparatus, the cache instruction broadcasting unit may broadcast the cache instruction to instruct the reception apparatus to perform the caching by storing the first additional data into a cache memory when the first additional data has been stored in a predetermined storage medium, and the use instruction broadcasting unit may broadcast the use instruction to instruct the reception apparatus to use, (a) when the first additional data has been stored in the cache memory according to the cache instruction, the first additional data stored in the cache memory, and (b) when the first additional data has not been stored in the cache memory according to the cache instruction, the first additional data stored in the predetermined storage medium.

With this construction, the broadcast apparatus can instruct to cache the first additional data, which is stored in the predetermined storage medium, into the cache memory before the start of the broadcast time period and instruct to use it during the broadcast time period. Accordingly, the reception apparatus can effectively cache and use the first additional data according to the instructions.

Here, in the broadcast apparatus, the acquiring unit may further acquire second additional data corresponding to the second program data and a broadcast time period of the second program data. The broadcast apparatus may further include a judging unit for judging whether the broadcast time period of the second program data is longer than a predetermined criterion time period. Moreover, the multiplexing unit may, (a) when the judging unit judges that the broadcast time period of the second program data is longer than the predetermined criterion time period, repeatedly multiplex the second additional data with the second program data until the specific time, repeatedly multiplex the first additional data with the second program data from the specific time to the start of the broadcast time period of the first program data, and repeatedly multiplex the first additional data with the first program data during the broadcast time period of the first program data, and (b) when the judging unit judges that the broadcast time period of the second program data is no longer than the predetermined criterion time period, repeatedly multiplex the second additional data with the second program data until the specific time, repeatedly multiplex the second additional data and the first additional data with the second program data from the specific time to the start of the broadcast time period of the first program data, and repeatedly multiplex the first additional data with the first program data during the broadcast time period of the first program data.

With this construction, when the broadcast time period of the second program data is no longer than the criterion time period, the second additional data and the first additional data can be multiplexed with the second program data from the specific time to the start of the broadcast time period of the first program data.

Accordingly, additional data corresponding to relatively long program data can be stopped being subjected to multiplex before the end of its broadcast time period. On the other hand, additional data corresponding to relatively short program can continue to be subjected to multiplex until its broadcast end time.

Here, in the broadcast apparatus, the acquiring unit may further acquire second additional data corresponding to the second program data and a broadcast time period of the second program data. The broadcast apparatus may further include a judging unit for judging whether the broadcast time period of the second program data is longer than a predetermined criterion time period. Moreover, the multiplexing unit may (a) repeatedly multiplex the second additional data with the second program data until the specific time so that a bandwidth for the second additional data is allocated to a predetermined bandwidth, (b) when the judging unit judges that the broadcast time period of the second program data is longer than the predetermined criterion time period, repeatedly multiplex the first additional data with the second program data from the specific time to the start of the broadcast time period of the first program data so that a bandwidth for the first additional data is allocated to the predetermined bandwidth, and repeatedly multiplex the first additional data with the first program data during the broadcast time period of the first program data, and (c) when the judging unit judges that the broadcast time period of the second program data is no longer than the predetermined criterion time period, so that a total bandwidth for the second additional data and the first additional data is allocated to the predetermined bandwidth, repeatedly multiplex the second additional data and the first additional data with the second program data from the specific time to the start of the broadcast time period of the first program data, and repeatedly multiplex the first additional data with the first program data during the broadcast time period of the first program data.

With this construction, when the broadcast time period of the second program data is no longer than the criterion time period, the second additional data and the first additional data can be multiplexed with the second program data from the specific time to the start of the broadcast time period of the first program data so that the total bandwidth for the second additional data and the first additional data is allocated to the predetermined bandwidth, which is allocated only for the second additional data until the specific time.

Therefore, additional data corresponding to relatively long program data can be stopped being subjected to multiplex before its broadcast end time. On the other hand, additional data corresponding to relatively short program data can continue to be subjected to multiplex until its broadcast end time. Accordingly, the bandwidth can be fixed and allocated efficiently depending on each condition.

Here, in the broadcast apparatus, the first additional data acquiring unit may further acquire second additional data corresponding to the second program data and a broadcast time period of the second program data. The broadcast apparatus may further include a judging unit for judging whether the broadcast time period of the second program data is longer than a predetermined criterion time period. Moreover, the multiplexing unit may (a) repeatedly multiplex the second additional data with the second program data until the specific time so that a bandwidth for the second additional data is allocated to a predetermined bandwidth, (b) when the judging unit judges that the broadcast time period of the second program data is longer than the predetermined criterion time period, so that a bandwidth for the first additional data is allocated to the predetermined bandwidth, repeatedly multiplex the first additional data with the second program data from the specific time to the start of the broadcast time period of the first program data and repeatedly multiplex the first additional data with the first program data during the broadcast time period of the first program data, and (c) when the judging unit judges that the broadcast time period of the second program data is no longer than the predetermined criterion time period, repeatedly multiplex the second additional data and the first additional data with the second program data from the specific time to the start of the broadcast time period of the first program data so that a total bandwidth for the second additional data and the first additional data is increased by adding a bandwidth for the first additional data to the predetermined bandwidth and repeatedly multiplex the first additional data with the first program data during the broadcast time period of the first program data so that a bandwidth for the first additional data is allocated to the predetermined bandwidth.

With this construction, when the broadcast time period of the second program data is no longer than the criterion time period, the second additional data and the additional data can be multiplexed with the second program data from the specific time to the start of the broadcast time period of the first program data so that the bandwidth for the second additional data keeps the predetermined bandwidth, and the total bandwidth for the second additional data and the first additional data is increased by adding the bandwidth for the first additional data to the predetermined bandwidth.

Therefore, additional data corresponding to relatively long program data can be stopped being subjected to multiplex before its broadcast end time. On the other hand, additional data corresponding to relatively short program data can continue to be subjected to multiplex until its broadcast end time in a fixed bandwidth. Accordingly, the transmission rate can be fixed, and the total bandwidth can be changed depending on each condition.

Here, in the broadcast apparatus, when the judging unit judges that the broadcast time period of the second program data is no longer than the predetermined criterion time period, the multiplexing unit may repeatedly multiplex the second additional data and the first additional data with the second program data during the broadcast time period of the second program data.

With this construction, when the broadcast time period of the second program data is no longer than the criterion time period, the second additional data alone need not be multiplexed with the second program data. Therefore, replacement of additional data to be multiplexed with program data is not performed at the time. Accordingly, this can reduce the load of multiplexing operations.

Here, the broadcast apparatus may further include: a criterion time period determining unit for determining the predetermined criterion time period to be used by the judging unit by multiplying a time period of a broadcast cycle of additional data by a predetermined coefficient.

With this construction, the criterion time period can be determined based on the time period of a broadcast cycle of additional data. Accordingly, even if the time period of a broadcast cycle of additional data changes, the criterion time period can be automatically changed.

Here, in the broadcast apparatus, the acquiring unit may further acquire second additional data corresponding to the second program data and a broadcast time period of the second program data. The second additional data may be updated during the broadcast time period of the second program data. The broadcast apparatus may further include a judging unit for judging whether a time period from the last update time of the second additional data to the start of the broadcast time period of the first program data is longer than a predetermined criterion time period. Moreover, the multiplexing unit may, (a) when the judging unit judges that the time period from the last update time of the second additional data to the start of the broadcast time period of the first program data is longer than the predetermined criterion time period, repeatedly multiplex the second additional data with the second program data until the specific time, repeatedly multiplex the first additional data with the second program data from the specific time to the start of the broadcast time period of the first program data, and repeatedly multiplex the first additional data with the first program data during the broadcast time period of the first program data, and (b) when the judging unit judges that the time period from the last update time of the second additional data to the start of the broadcast time period of the first program data is no longer than the predetermined criterion time period, repeatedly multiplex the second additional data with the second program data until the specific time, repeatedly multiplex the second additional data and the first additional data with the second program data from the specific time to the start of the broadcast time period of the first program data, and repeatedly multiplex the first additional data with the first program data during the broadcast time period of the first program data.

With this construction, when the broadcast time period of the last updated second additional data which is multiplexed with the second program data is no longer than the criterion time period, the second additional data and the first additional data can be multiplexed with the second program data from the specific time to the start of the broadcast time period of the first program data.

Accordingly, additional data with a relatively long broadcast time period after being updated can be stopped being subjected to multiplex before its corresponding program data broadcast end time. On the other hand, additional data with a relatively short broadcast time period after being updated can continue to be subjected to multiplex until its corresponding program data broadcast end time.

Here, in the broadcast apparatus, the acquiring unit may further acquire second additional data corresponding to the second program data and a broadcast time period of the second program data. The second additional data may be updated during the broadcast time period of the second program data. The broadcast apparatus may further include a judging unit for judging whether a time period from the last update time of the second additional data to the start of the broadcast time period of the first program data is longer than a predetermined criterion time period. Moreover, the multiplexing unit may (a) repeatedly multiplex the second additional data with the second program data until the specific time so that a bandwidth for the second additional data is allocated to a predetermined bandwidth, (b) when the judging unit judges that the time period from the last update time of the second additional data to the start of the broadcast time period of the first program data is longer than the predetermined criterion time period, repeatedly multiplex the first additional data with the second program data from the specific time to the start of the broadcast time period of the first program data so that a bandwidth for the first additional data is allocated to the predetermined bandwidth and repeatedly multiplex the first additional data with the first program data during the broadcast time period of the first program data, and (c) when the judging unit judges the time period from the last update time of the second additional data to the start of the broadcast time period of the first program data is no longer than the predetermined criterion time period, repeatedly multiplex the second additional data and the first additional data with the second program data from the specific time to the start of the broadcast time period of the first program data so that a total bandwidth for the second additional data and the first additional data is allocated to the predetermined bandwidth and repeatedly multiplex the first additional data with the first program data during the broadcast time period of the first program data.

With this construction, when the broadcast time period of the last updated second additional data which is multiplexed with the second program data is no longer than the criterion time period, the second additional data and the first additional data can be multiplexed with the second program data from the specific time to the start of the broadcast time period of the first program data so that the total bandwidth for the second additional data and the first additional data is allocated to the predetermined bandwidth, which is allocated only for the second additional data until the specific time.

Therefore, additional data with a relatively long broadcast time period after being updated can be stopped being subjected to multiplex before its corresponding program data broadcast end time. On the other hand, additional data with a relatively short broadcast time period after updated can continue to be subjected to multiplex until its corresponding program data broadcast end time. Accordingly, the bandwidth can be fixed and allocated efficiently depending on each condition.

Here, in the broadcast apparatus, the acquiring unit may further acquire second additional data corresponding to the second program data and a broadcast time period of the second program data. The second additional data may be updated during the broadcast time period of the second program data. The broadcast apparatus may further include a judging unit for judging whether a time period from a last update time of the second additional data to the start of the broadcast time period of the first program data is longer than a predetermined criterion time period. Moreover, the multiplexing unit may (a) repeatedly multiplex the second additional data with the second program data until the specific time so that a bandwidth for the second additional data is allocated to a predetermined bandwidth, (b) when the judging unit judges that the time period from the last update time of the second additional data to the start of the broadcast time period of the first program data is longer than the predetermined criterion time period, so that a bandwidth for the first additional data is allocated to the predetermined bandwidth, repeatedly multiplex the first additional data with the second program data from the specific time to the start of the broadcast time period of the first program data and repeatedly multiplex the first additional data with the first program data during the broadcast time period of the first program data, and (c) when the judging unit judges that the time period from the last update time of the second additional data to the start of the broadcast time period of the first program data is no longer than the predetermined criterion time period, repeatedly multiplex the second additional data and the first additional data with the second program data from the specific time to the start of the broadcast time period of the first program data so that a total bandwidth for the second additional data and the first additional data is increased by adding a bandwidth for the first additional data to the predetermined bandwidth and repeatedly multiplex the first additional data with the first program data during the broadcast time period of the first program data so that a bandwidth for the first additional data is allocated to the predetermined bandwidth.

With this construction, when the broadcast time period of the last updated second additional data which is multiplexed with the second program data is no longer than the criterion time period, the second additional data and the first additional data can be multiplexed with the second program data from the specific time to the start of the broadcast time period of the first program data so that the bandwidth for the second additional data keeps the predetermined bandwidth, and the total bandwidth for the second additional data and the first additional data is increased by adding the bandwidth for the first additional data to the predetermined bandwidth.

Therefore, additional data with a relatively long broadcast time period after being updated can be stopped being subjected to multiplex before its corresponding program data broadcast end time. On the other hand, additional data with a relatively short broadcast time period after being updated can continue to be subjected to multiplex until its corresponding program data broadcast end time. Accordingly, the transmission rate can be fixed, and the total bandwidth can be changed depending on each condition.

Here, in the broadcast apparatus, when the judging unit judges that the time period from the last update time of the second additional data to the start of the broadcast time period of the first program data is no longer than the predetermined criterion time period, the multiplexing unit may repeatedly multiplex the second additional data and the first additional data with the second program data during the time period from the last update time of the second additional data to the start of the broadcast time period of the first program data.

With this construction, when the broadcast time period of the last updated additional data which is multiplexed with the second program data is no longer than the criterion time period, the last updated additional data alone is not multiplexed with the second program data. Therefore, replacement of additional data to be multiplexed with program data is not performed at the time. Accordingly, this can reduce the load of multiplexing operations.

Here, the broadcast apparatus may further include: a criterion time period determining unit for determining the predetermined criterion time period to be used by the judging unit by multiplying a time period of a broadcast cycle of additional data by a predetermined coefficient.

Here, in the broadcast apparatus, the acquiring unit may further acquire second additional data corresponding to the second program data. The broadcast apparatus may further include a judging unit for judging whether the broadcast time period is shorter than a predetermined criterion time period. Moreover, the multiplexing unit may, (a) when the judging unit judges that the broadcast time period is shorter than the predetermined criterion time period, repeatedly multiplex the second additional data with the second program data until the specific time, repeatedly multiplex the first additional data with the second program data from the specific time to the start of the broadcast time period, and repeatedly multiplex the first additional data with the first program data during the broadcast time period, and (b) when the judging unit judges that the broadcast time period is no shorter than the predetermined criterion time period, repeatedly multiplex the second additional data with the second program data until the start of the broadcast time period and repeatedly multiplex the first additional data with the first program data during the broadcast time period.

With this construction, when the broadcast time period of the first program data is no shorter than the criterion time period, the first additional data can be multiplexed with the first program data from the start of the broadcast time period. Therefore, only when the broadcast time period is shorter than the criterion time period, they can be previously multiplexed.

Accordingly, the broadcast start time of additional data can be efficiently determined depending on each condition.

Here, in the broadcast apparatus, the acquiring unit may further acquire second additional data corresponding to the second program data. The first additional data may be updated during the broadcast time period of the first program data. The broadcast apparatus may further include a judging unit for judging whether a time period from the start of the broadcast time period to the first update time of the first additional data is longer than a predetermined criterion time period. Moreover, the multiplexing unit may, (a) when the judging unit judges that the time period from the start of the broadcast time period to the first update time of the first additional data is shorter than the predetermined criterion time period, repeatedly multiplex the second additional data with the second program data until the specific time, repeatedly multiplex the first additional data with the second program data from the specific time to the start of the broadcast time period, and repeatedly multiplex the first additional data with the first program data during the broadcast time period, and (b) when the judging unit judges that the time period from the start of the broadcast time period to the first update time of the first additional data is no shorter than the predetermined criterion time period, repeatedly multiplex the second additional data with the second program data until the start of the broadcast time period and repeatedly multiplex the first additional data with the first program data during the broadcast time period.

With this construction, when the time period from the start of the broadcast time period of the first program data to the first update time of the first additional data is no shorter than the criterion time period, the first additional data can be multiplexed with the first program data from the start of the broadcast time period of the first program data. Therefore, only when the time period is shorter than the criterion time period, they can be previously multiplexed.

Accordingly, the broadcast start time of additional data can be efficiently determined depending on each condition.

Here, the broadcast apparatus may further include: a criterion time period determining unit for determining the predetermined criterion time period to be used by the judging unit by multiplying a time period of a broadcast cycle of additional data by a predetermined coefficient.

Here, in the broadcast apparatus, the acquiring unit may further acquire second additional data corresponding to the second program data. The broadcast apparatus may have judgement information which indicates whether the multiplexing for the first additional data is to be started previous to the start of the broadcast time period. Moreover, the multiplexing unit may, (a) when the judgement information indicates that the multiplexing is to be started previously, repeatedly multiplex the second additional data with the second program data until the specific time, repeatedly multiplex the first additional data with the second program data from the specific time to the start of the broadcast time period, and repeatedly multiplex the first additional data with the first program data during the broadcast time period, and (b) when the judgement information indicates that the multiplexing is not to be started previously, repeatedly multiplex the second additional data with the second program data until the start of the broadcast time period and repeatedly multiplex the first additional data with the first program data during the broadcast time period.

With this construction, when judgement information indicates that the first additional data is not to be subjected to previous multiplex, the first additional data is not multiplexed with the second program data before the start of the broadcast time period of the first program data. Therefore, the given bandwidth can be allocated only for the second additional data broadcasting until the start of the broadcast time period. Accordingly, the transmission time can be minimized.

The object of the present invention also can be achieved by a broadcast apparatus for multiplexing and broadcasting program data which is to be reproduced by a reception apparatus soon after receipt and additional data corresponding to the program data, the broadcast apparatus including: an acquiring unit for acquiring first program data, first additional data corresponding to the first program data, a broadcast time period of the first program data, second program data to be broadcast before the first program data, second additional data corresponding to the second program data, and a broadcast time period of the second program data; a judging unit for judging, for each of the broadcast time period of the first program data and the broadcast time period of the second program data, whether the broadcast time period is shorter than a predetermined criterion time period; a multiplexing unit for, (a) in a first case where the broadcast time period of the first program data is shorter than the predetermined criterion time period and the broadcast time period of the second program data is no shorter than the predetermined criterion time period, repeatedly multiplexing the second additional data with the second program data until a specific time, repeatedly multiplexing the first additional data with the second program data from the specific time to a start of the broadcast time period of the first program data, and repeatedly multiplexing the first additional data with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data with the second program data from the specific time to the start of the broadcast time period of the first program data and repeatedly multiplexing the first additional data with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data with the first program data during the broadcast time period of the first program data; and a broadcasting unit for broadcasting the data multiplexed by the multiplexing unit.

With this construction, the broadcast apparatus can start to multiplex the first additional data corresponding to the first program data whose broadcast time period is short with the second program data before the start of the broadcast time period of the first program data. Therefore, the reception apparatus can receive and cache the first additional data before the start of the broadcast time period.

Accordingly, the reception apparatus can start to use the first additional data at the start of the broadcast time period.

Also, the broadcast apparatus can continue to multiplex the first additional data with the first program data and broadcast them until the end of the broadcast time period. Therefore, even when starting to receive them after the start of the broadcast time period, the reception apparatus can receive and use the first additional data.

Additionally, since additional data corresponding to program data whose broadcast time period is long can be stopped being multiplexed with the second program data before the specific time, the given bandwidth can allocated only for the second additional data broadcasting. Accordingly, the transmission time can be minimized.

Here, in the broadcast apparatus, the multiplexing unit may (a) repeatedly multiplex the second additional data with the second program data until the specific time so that a bandwidth for the second additional data is allocated to a predetermined bandwidth, (b) in the first case, repeatedly multiplex the first additional data with the second program data from the specific time to the start of the broadcast time period of the first program data so that a bandwidth for the first additional data is allocated to the predetermined bandwidth, and (c) in the second case, repeatedly multiplex the second additional data and the first additional data with the second program data from the specific time to the start of the broadcast time period of the first program data so that a total bandwidth for the first additional data and the first additional data is allocated to the predetermined bandwidth.

With this construction, the second additional data corresponding to the second program data whose broadcast time period is short can be multiplexed with the second program data so that the total bandwidth for the second additional data and the first additional data keeps the predetermined bandwidth, which is allocated only for the second additional data. Accordingly, the bandwidth can be fixed and efficiently allocated depending on each condition.

Here, in the broadcast apparatus, the multiplexing unit may (a) repeatedly multiplex the second additional data with the second program data until the specific time so that a bandwidth for the second additional data is allocated to a predetermined bandwidth, (b) in the first case, repeatedly multiplex the first additional data with the second program data from the specific time to the start of the broadcast time period of the first program data so that a bandwidth for the first additional data is allocated to the predetermined bandwidth, and (c) in the second case, repeatedly multiplex the second additional data and the first additional data with the second program data from the specific time to the start of the broadcast time period of the first program data so that a total bandwidth for the first additional data and the first additional data is increased by adding a bandwidth for the first additional data to the predetermined bandwidth.

With this construction, the second additional data corresponding to the second program data whose broadcast time period is short can be multiplexed with the second program data so that the bandwidth for the second additional data keeps the predetermined bandwidth, and the total bandwidth for the second additional data and the first additional data is increased by adding the bandwidth for the first additional data to the predetermined bandwidth. Accordingly, the total bandwidth can be changed depending on each condition.

The object of the present invention also can be achieved by a broadcast apparatus for multiplexing and broadcasting program data which is to be reproduced by a reception apparatus soon after receipt and additional data which corresponds to the program data, the broadcast apparatus including: an acquiring unit for acquiring first program data, first additional data corresponding to the first program data, a broadcast time period of the first program data, second program data which is to be broadcast before the first program data, and second additional data corresponding to the second program data; an accepting unit for accepting, from an outside, judgement on whether multiplexing for the first additional data is to be started at a specific time or a start time of the broadcast time period, the specific time being a point in time before the start of the broadcast time period, and a time period between the specific time and the start of the broadcast time period being a predetermined time period; a multiplexing unit for, (a) in a first case that the accepting unit accepts judgement that the multiplexing for the first additional data is to be started at the specific time, repeatedly multiplexing the second additional data with the second program data until the specific time, repeatedly multiplexing the first additional data with the second program data from the specific time to the start of the broadcast time period, and repeatedly multiplexing the first additional data with the first program data during the broadcast time period, and (b) in a second case that the accepting unit accepts judgement that the multiplexing for the first additional data is to be started at the start time, repeatedly multiplexing the second additional data with the second program data until the start of the broadcast time period and repeatedly multiplexing the first additional data with the first program data during the broadcast time period; and a broadcasting unit for broadcasting the data multiplexed by the multiplexing unit.

With this construction, the broadcast apparatus can start to multiplex the first additional data corresponding to the first program data with the second program data, which is to be broadcast before the first program data, before the start of the broadcast time period of the first program data only when an outside judges that previous multiplex is necessary. Then the reception apparatus can receive and cache the first additional data before the start of the broadcast time period.

Accordingly, the reception apparatus can start to use the first additional data at the start of the broadcast time period.

Also, the broadcast apparatus can continue to multiplex the first additional data with the first program data and broadcast them until the end of the broadcast time period. Therefore, even when starting to receive them after the start of the broadcast time period, the reception apparatus can receive and use the first additional data.

Therefore, the second additional data can be stopped being multiplexed with the second program data at the specific time. Therefore, the predetermined bandwidth can be allocated only for the first additional data. Accordingly, the transmission time can be minimized.

Here, in the broadcast apparatus, the multiplexing unit may (a) repeatedly multiplex the second additional data with the second program data until the specific time so that a bandwidth for the second additional data is allocated to a predetermined bandwidth, and (b) in the first case, repeatedly multiplex the first additional data with the second program data from the specific time to the start of the broadcast time period of the first program data so that a bandwidth for the first additional data is allocated to the predetermined bandwidth.

With this construction, the first additional data can be multiplexed with the second program data on the same bandwidth which is allocated for the second broadcast data until the specific time. Accordingly, the bandwidth can be fixed even around the specific time.

The object of the present invention also can be achieved by a broadcast apparatus for multiplexing and broadcasting program data which is to be reproduced by a reception apparatus soon after receipt and additional data which corresponds to the program data, the broadcast apparatus including: an acquiring unit for acquiring first program data, first additional data corresponding to the first program data, a broadcast time period of the first program data, second program data which is to be broadcast before the first program data, and second additional data corresponding to the second program data: an accepting unit for accepting, from an outside, judgement on whether multiplexing for the second additional data is to be continued until the start of the broadcast time period; a multiplexing unit for, (a) in a first case that the accepting unit accepts judgement that the multiplexing for the second additional data is not to be continued until the start of the broadcast time period, repeatedly multiplexing the second additional data with the second program data until the specific time, repeatedly multiplexing the first additional data with the second program data from the specific time to the start of the broadcast time period, and repeatedly multiplexing the first additional data with the first program data during the broadcast time period, and (b) in a second case that the accepting unit accepts judgement that multiplexing for the second additional data is to be continued until the start of the broadcast time period, repeatedly multiplexing the second additional data and the first additional data with the second program data from the specific time to the start of the broadcast time period and repeatedly multiplexing the first additional data with the first program data during the broadcast time period; and a broadcasting unit for broadcasting the data multiplexed by the multiplexing unit.

With this construction, the broadcast apparatus can start to multiplex the first additional data with the second program data before the start of the broadcast time period of the first program data. Also an outside can determine that the first additional data alone is multiplexed with the second program data or that the second additional data and the first additional data are multiplexed with the second program data.

Here, in the broadcast apparatus, the multiplexing unit may (a) repeatedly multiplex the second additional data with the second program data until the specific time so that a bandwidth for the second additional data is allocated to a predetermined bandwidth, (b) in the first case, repeatedly multiplex the first additional data with the second program data from the specific time to the start of the broadcast time period so that a bandwidth for the first additional data is allocated to the predetermined bandwidth, and (c) in the second case, repeatedly multiplex the second additional data and the first additional data with the second program data from the specific time to the start of the broadcast time period so that a total bandwidth for the first additional data and the first additional data is increased by adding a bandwidth for the first additional data to the predetermined bandwidth.

With this construction, from the specific time to the start of the broadcast time period of the first program data, the first additional data can be multiplexed with the second program data on the same bandwidth which is allocated for the second additional data until the specific time, or the second additional data and the first additional data can be multiplexed with the second program data on the predetermined bandwidth. Accordingly, the bandwidth can be fixed around the specific time.

Here, in the broadcast apparatus, the multiplexing unit may (a) repeatedly multiplex the second additional data with the second program data until the specific time so that a bandwidth for the second additional data is allocated to a predetermined bandwidth, (b) in the first case, repeatedly multiplex the first additional data with the second program data from the specific time to the start of the broadcast time period so that a bandwidth for the first additional data is allocated to the predetermined bandwidth, and (c) in the second case, repeatedly multiplex the second additional data and the first additional data with the second program data from the specific time to the start of the broadcast time period so that a total bandwidth for the first additional data and the first additional data is increased by adding a bandwidth for the first additional data to the predetermined bandwidth.

With this construction, from the specific time to the start of the broadcast time period of the first program data, the first additional data can be multiplexed with the second program data on the predetermined bandwidth, or the second additional data and the first additional data can be multiplexed with the second program data so that the bandwidth for the second additional data keeps the predetermined bandwidth, and the total bandwidth for the second additional data and the first additional data is increased by adding the bandwidth for the first additional data to the predetermined bandwidth.

Here, in the broadcast apparatus, the accepting unit may further accept, from the outside, an indication of the predetermined time period.

With this construction, an outside can determine the specific time.

The object of the present invention can also be achieved by a reception apparatus for receiving and reproducing broadcast data which is repeatedly broadcast on a predetermined bandwidth, the reception apparatus including: a receiving unit for receiving first broadcast data to be reproduced during a reproduction time period, the first broadcast data being repeatedly broadcast from a point of a predetermined time period before a start of the reproduction time period to an end of the reproduction time period; a caching unit for caching the first broadcast data until the start of the reproduction time period when the first broadcast data is received during the predetermined time period: and a reproducing unit for reproducing the cached first broadcast data when the first broadcast data has been cached by the caching unit.

With this construction, when starting to receive the first broadcast data before the start of the reproduction time period of the first broadcast data, the reception apparatus can cache the first broadcast data before the start of the reproduction time period. Accordingly, the reception apparatus can start to reproduce the cached first broadcast data at the start of the reproduction time period.

Also, when starting to receive the first broadcast data after the start of the reproduction time period, the reception apparatus can reproduce the received first broadcast data.

Here, in the reception apparatus, the receiving unit may further receive a cache instruction to accumulate the first broadcast data before the start of the reproduction time period and a reproduction instruction to reproduce, during the reproduction time period, (a) when the first broadcast data has been accumulated, the accumulated first broadcast data and (b) when the first broadcast data has not been accumulated, the received first broadcast data. The caching unit may accumulate the first broadcast data before the start of the reproduction time period, according to the cache instruction. Moreover, the reproducing unit may reproduce, during the reproduction time period, (a) when the first broadcast data has been accumulated, the accumulated first broadcast data, and (b) when the first broadcast data is not accumulated, the first broadcast data which is received by the receiving unit, according to the reproduction instruction.

With this construction, when starting to receive the first broadcast data before the start of the reproduction time period, the reception apparatus can accumulate the first broadcast data before the start of the reproduction time period according to the cache instruction and start to reproduce the accumulated first broadcast data at the start of the reproduction time period. On the other hand, when starting to receive the first broadcast data after the start of the reproduction time period, the reception apparatus can reproduce the received first broadcast data.

Here, in the reception apparatus, the receiving unit may further receive a cache instruction to store the first broadcast data into a cache memory when the first broadcast data has been stored in a predetermined storage medium before the start of the reproduction time period and a reproduction instruction to reproduce, during the reproduction time period, (a) when the first broadcast data has been stored in the cache memory, the cached first broadcast data and (b) when the first broadcast data has not been stored in the cache memory, the first broadcast data received by the receiving unit or the first broadcast data stored in the predetermined storage medium. The caching unit may store the first broadcast data into the cache memory before the start of the reproduction time period, according to the cache instruction. Moreover, the reproducing unit may reproduce, during the reproduction time period, (a) when the first broadcast data has been stored in the cache memory, the first broadcast data stored in the cache memory, and (b) when the first broadcast data is not stored in the cache memory, the first broadcast data stored in the predetermined storage medium or the first broadcast data received by the receiving unit, according to the reproduction instruction.

With this construction, when the reception apparatus starts to receive the first broadcast data before the start of the reproduction time period and the first broadcast data has been stored in the predetermined storage medium, the reception apparatus can store the first broadcast data in the cache memory before the start of the reproduction time period according to the cache instruction and start to reproduce the first broadcast data stored in the cache memory at the start of the reproduction time period. On the other hand, when the first broadcast data has not been stored in the cache memory, the reception apparatus can reproduce the received first broadcast data or the first broadcast data stored in the predetermined storage medium according to the reproduction instruction.

The object of the present invention can be achieved by a reception apparatus for receiving multiplexed data which is made up of program data which is to be reproduced by a reception apparatus soon after receipt and additional data which corresponds to the program data so that a total bandwidth is allocated to a predetermined bandwidth, the reception apparatus including: a receiving unit for repeatedly receiving (a) multiplexed data which is made up of first additional data corresponding to first program data and second program data, from a point of a predetermined time period before a start of a broadcast time period in which the first program data is to be reproduced to an end of the broadcast time period, the second program data being to be reproduced before the first program data, and (b) multiplexed data which is made up of the first additional data and the first program data, during the broadcast time period; a reproducing unit for reproducing the first program data during the broadcast time period; a caching unit for caching the first additional data until the start of the broadcast time period when the receiving unit receives the multiplexed data including the first additional data during the predetermined time period; and a using unit for using the cached first additional data when the first additional data has been cached by the caching unit.

With this construction, when starting to receive the first additional data before the start of broadcast time period, the reception apparatus can cache the first additional data before the start of the broadcast time period of the first program data and use the cached first additional data during the broadcast time period.

Accordingly, the reception apparatus can start to use the first additional data at the start of the broadcast time period.

On the other hand, when starting to receive the first additional data after the start of the broadcast time period, the reception apparatus can use the received first additional data.

Here, in the reception apparatus, the receiving unit may further receive a cache instruction to accumulate the first additional data before the start of the broadcast time period and a use instruction to use, during the broadcast time period, (a) when the first broadcast data has not been accumulated, the accumulated first additional data when the first additional data has been accumulated and (b) when the first additional data has not been accumulated, the received first additional data. The caching unit may accumulate the first additional data before the start of the broadcast time period, according to the cache instruction. Moreover, the using unit may use, during the broadcast time period, (a) when the first additional data has been accumulated, the accumulated first additional data, and (b) when the first additional data is not accumulated, the first additional data which is received by the receiving unit, according to the use instruction.

With this construction, when starting to receive the first additional data before the start of the broadcast time period, the reception apparatus can accumulate the first additional data before the start of the broadcast time period according to the cache instruction and start to use the accumulated first additional data at the start of the broadcast time period. On the other hand, when starting to receive the first additional data after the start of broadcast time period of the first program data, the reception apparatus can use the received first additional data.

Here, in the reception apparatus, the receiving unit can further receive a cache instruction to cache the first additional data when the first additional data has been stored in a predetermined storage medium before the start of the broadcast time period and a use instruction to use, during the broadcast time period, (a) when the first additional data has been stored in the cache memory, the first additional data stored in the cache memory and (b) when the first additional data has not been stored in the cache memory, the first additional data received by the receiving unit or the first additional data stored in the predetermined storage medium. The caching unit may store the first additional data into the cache memory before the start of the broadcast time period, according to the cache instruction. Moreover, the using unit may use, during the broadcast time period, (a) when the first additional data has been stored in the cache memory, the first additional data stored in the cache memory, and (b) when the first additional data is not stored in the cache memory, the first additional data stored in the predetermined storage medium or the first additional data received by the receiving unit, according to the use instruction.

With this construction, when the reception apparatus starts to receive the first additional data before the start of the broadcast time period and the first additional data is stored in the predetermined storage medium, the reception apparatus can store the first additional data in the cache memory before the start of the broadcast time period according to the cache instruction and start to use the first additional data stored in the cache memory at the start of the broadcast time period. On the other hand, when the first additional data is not stored in the cache memory, the reception apparatus can use the received first additional data or the first additional data stored in the predetermined storage medium according to the use instruction.

The object of the present invention can be achieved by a broadcast method for broadcasting broadcast data including: an acquiring step for acquiring first broadcast data and a reproduction time period in which the first broadcast data is to be reproduced by a reception apparatus; and a broadcasting step for repeatedly broadcasting the first broadcast data from a specific time to an end of the reproduction time period, the specific time being a point in time before a start of the reproduction time period, and a time period between the specific time and the start of the reproduction time period being a predetermined time period.

Thereby, the first broadcast data can start to be broadcast before the start of the reproduction time period. Then, the reception apparatus can receive and cache the first broadcast data before the start of the reproduction time period.

The object of the present invention can be achieved by a broadcast method for multiplexing and broadcasting program data which is to be reproduced by a reception apparatus soon after receipt and additional data which corresponds to the program data, the broadcast method including: an acquiring step for acquiring first program data, first additional data corresponding to the first program data, a broadcast time period of the first program data, and second program data which is to be broadcast before the first program data; a multiplexing step for repeatedly multiplexing the first additional data with the second program data from a specific time to a start of the broadcast time period and repeatedly multiplexing the first additional data with the first program data during the broadcast time period, the specific time being a point in time before the start of the broadcast time period, and a time period between the specific time and the start of the broadcast time period being a predetermined time period; and a broadcasting step for broadcasting the data multiplexed in the multiplexing step.

Thereby, the first additional data corresponding to the first program data can be multiplexed with the second program data, which is to be broadcast before the first program data, and broadcast, before the start of the broadcast time period of the first program data. Then, the reception apparatus can receive and cache the first additional data before the start of the broadcast time period.

Accordingly, the reception apparatus can start to use the first additional data at the start of the broadcast time period.

Also, the first additional data can continue to be multiplexed with the first program data and broadcast until the end of the broadcast time period. Therefore, even when starting to receive them after the start of the broadcast time period, the reception apparatus can receive and use the first additional data.

The object of the present invention can be achieved by a broadcast method for multiplexing and broadcasting program data which is to be reproduced by a reception apparatus soon after receipt and additional data corresponding to the program data, the broadcast method including: an acquiring step for acquiring first program data, first additional data corresponding to the first program data, a broadcast time period of the first program data, second program data to be broadcast before the first program data, second additional data corresponding to the second program data, and a broadcast time period of the second program data; a judging step for judging, for each of the broadcast time period of the first program data and the broadcast time period of the second program data, whether the broadcast time period is shorter than a predetermined criterion time period; a multiplexing step for, (a) in a first case where the broadcast time period of the first program data is shorter than the predetermined criterion time period and the broadcast time period of the second program data is no shorter than the predetermined criterion time period, repeatedly multiplexing the second additional data with the second program data until a specific time, repeatedly multiplexing the first additional data with the second program data from the specific time to a start of the broadcast time period of the first program data, and repeatedly multiplexing the first additional data with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data with the second program data from the specific time to the start of the broadcast time period of the first program data and repeatedly multiplexing the first additional data with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data with the first program data during the broadcast time period of the first program data; and a broadcasting step for broadcasting the data multiplexed in the multiplexing step.

Thereby, the first additional data corresponding to the first program data whose broadcast time period is short can start to be multiplexed with the second program data before the start of the broadcast time period of the first program data. Therefore, the reception apparatus can receive and cache the first additional data before the start of the broadcast time period.

Accordingly, the reception apparatus can start to use the first additional data at the start of the broadcast time period.

Also, the first additional data can continue to be multiplexed with the first program data and broadcast until the end of the broadcast time period. Therefore, even when starting to receive them after the start of the broadcast time period, the reception apparatus can receive and use the first additional data.

Additionally, since additional data corresponding to program data whose broadcast time period is long can be stopped being multiplexed with the second program data before the specific time, the given bandwidth can allocated only for the second additional data broadcasting. Accordingly, the transmission time can be minimized.

The object of the present invention can be achieved by a reception method for receiving and reproducing broadcast data which is repeatedly broadcast on a predetermined bandwidth, the reception method including: a receiving step for receiving first broadcast data to be reproduced during a reproduction time period, the first broadcast data being repeatedly broadcast from a predetermined time period before a start of the reproduction time period to an end of the reproduction time period; a caching step for caching the first broadcast data until the start of the reproduction time period when the first broadcast data is received during the predetermined time period; and a reproducing step for reproducing the cached first broadcast data when the first broadcast data has been cached by the caching step.

Thereby, when starting to be received before the start of the reproduction time period of the first broadcast data, the first broadcast data can be cached before the start of the reproduction time period. Accordingly, the cached first broadcast data can start to be reproduced at the start of the reproduction time period.

Also, when starting to be received after the start of the reproduction time period, the received first broadcast data can be reproduced.

The object of the present invention can be achieved by a broadcast method for receiving multiplexed data which is made up of program data which is to be reproduced by a reception apparatus soon after receipt and additional data which corresponds to the program data so that a total bandwidth is allocated to a predetermined bandwidth, the reception method including: a receiving step for repeatedly receiving (a) multiplexed data which is made up of first additional data corresponding to first program data and second program data, from a predetermined time period before a start of a broadcast time period in which the first program data is to be reproduced to an end of the broadcast time period, the second program data being to be reproduced before the first program data, and (b) multiplexed data which is made up of the first additional data and the first program data, during the broadcast time period; a reproducing step for reproducing the first program data during the broadcast time period; a caching step for caching the first additional data until the start of the broadcast time period when the multiplexed data including the first additional data is received during the predetermined time period in the receiving step; and a using step for using the cached first additional data when the first additional data has been cached in the caching step.

Thereby, when starting to be received before the start of broadcast time period, the first additional data can be cached before the start of the broadcast time period of the first program data, and the cached first additional data can be used during the broadcast time period.

Accordingly, the first additional data can start to be used at the start of the broadcast time period.

On the other hand, when the first additional data starts to be received after the start of the broadcast time period, the received first additional data can be used.

The object of the present invention can be achieved by a broadcast program for broadcasting broadcast data, the broadcast program having a computer execute: an acquiring step for acquiring first broadcast data and a reproduction time period in which the first broadcast data is to be reproduced by a reception apparatus; and a broadcasting step for repeatedly broadcasting the first broadcast data from a specific time to an end of the reproduction time period, the specific time being a point in time before a start of the reproduction time period, and a time period between the specific time and the start of the reproduction time period being a predetermined time period.

Thereby, the first broadcast data can start to be broadcast before the start of the reproduction time period. Then, the reception apparatus can receive and cache the first broadcast data before the start of the reproduction time period.

Accordingly, the reception apparatus can start to reproduce the first broadcast data at the start of the reproduction time period.

Also, the first broadcast data can continue to be broadcast until the end of the reproduction time period. Accordingly, even when starting to receive the first broadcast data after the start of the reproduction time period, the reception apparatus can receive and reproduce it.

The object of the present invention can be achieved by a broadcast program for multiplexing and broadcasting program data which is to be reproduced by a reception apparatus soon after receipt and additional data which corresponds to the program data, the broadcast program having a computer execute: an acquiring step for acquiring first program data, first additional data corresponding to the first program data, a broadcast time period of the first program data, and second program data which is to be broadcast before the first program data; a multiplexing step for repeatedly multiplexing the first additional data with the second program data from a specific time to a start of the broadcast time period and repeatedly multiplexing the first additional data with the first program data during the broadcast time period, the specific time being a point in time before the start of the broadcast time period, and a time period between the specific time and the start of the broadcast time period being a predetermined time period; and a broadcasting step for broadcasting the data multiplexed in the multiplexing step.

Thereby, the first additional data corresponding to the first program data can be multiplexed with the second program data, which is to be broadcast before the first program data, and broadcast, before the start of the broadcast time period of the first program data. Then, the reception apparatus can receive and cache the first additional data before the start of the broadcast time period.

Accordingly, the reception apparatus can start to use the first additional data at the start of the broadcast time period.

Also, the first additional data can continue to be multiplexed with the first program data and broadcast until the end of the broadcast time period. Therefore, even when starting to receive them after the start of the broadcast time period, the reception apparatus can receive and use the first additional data.

The object of the present invention can be achieved by a broadcast program for multiplexing and broadcasting program data which is to be reproduced by a reception apparatus soon after receipt and additional data corresponding to the program data, the broadcast program having a computer execute: an acquiring step for acquiring first program data, first additional data corresponding to the first program data, a broadcast time period of the first program data, second program data to be broadcast before the first program data, second additional data corresponding to the second program data, and a broadcast time period of the second program data; a judging step for judging, for each of the broadcast time period of the first program data and the broadcast time period of the second program data, whether the broadcast time period is shorter than a predetermined criterion time period; a multiplexing step for, (a) in a first case where the broadcast time period of the first program data is shorter than the predetermined criterion time period and the broadcast time period of the second program data is no shorter than the predetermined criterion time period, repeatedly multiplexing the second additional data with the second program data until a specific time, repeatedly multiplexing the first additional data with the second program data from the specific time to a start of the broadcast time period of the first program data, and repeatedly multiplexing the first additional data with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data with the second program data from the specific time to the start of the broadcast time period of the first program data and repeatedly multiplexing the first additional data with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data with the first program data during the broadcast time period of the first program data; and a broadcasting step for broadcasting the data multiplexed in the multiplexing step.

Thereby, the first additional data corresponding to the first program data whose broadcast time period is short can start to be multiplexed with the second program data before the start of the broadcast time period of the first program data. Therefore, the reception apparatus can receive and cache the first additional data before the start of the broadcast time period.

Accordingly, the reception apparatus can start to use the first additional data at the start of the broadcast time period.

Also, the first additional data can continue to be multiplexed with the first program data and broadcast until the end of the broadcast time period. Therefore, even when starting to receive them after the start of the broadcast time period, the reception apparatus can receive and use the first additional data.

Additionally, since additional data corresponding to program data whose broadcast time period is long can be stopped being multiplexed with the second program data before the specific time, the given bandwidth can allocated only for the second additional data broadcasting. Accordingly, the transmission time can be minimized.

The object of the present invention can be achieved by a reception program for receiving and reproducing broadcast data which is repeatedly broadcast on a predetermined bandwidth, the reception program having a computer execute: a receiving step for receiving first broadcast data to be reproduced during a reproduction time period, the first broadcast data being repeatedly broadcast from a predetermined time period before a start of the reproduction time period to an end of the reproduction time period; a caching step for caching the first broadcast data until the start of the reproduction time period when the first broadcast data is received during the predetermined time period; and a reproducing step for reproducing the cached first broadcast data when the first broadcast data has been cached by the caching step.

Thereby, when starting to be received before the start of the reproduction time period of the first broadcast data, the first broadcast data can be cached before the start of the reproduction time period. Accordingly, the cached first broadcast data can start to be reproduced at the start of the reproduction time period.

Also, when starting to be received after the start of the reproduction time period, the received first broadcast data can be reproduced.

The object of the present invention can be achieved by a reception program for receiving multiplexed data which is made up of program data which is to be reproduced by a reception apparatus soon after receipt and additional data which corresponds to the program data so that a total bandwidth is allocated to a predetermined bandwidth, the reception, the reception program having a computer execute: a receiving step for repeatedly receiving (a) multiplexed data which is made up of first additional data corresponding to first program data and second program data, from a predetermined time period before a start of a broadcast time period in which the first program data is to be reproduced to an end of the broadcast time period, the second program data being to be reproduced before the first program data, and (b) multiplexed data which is made up of the first additional data and the first program data, during the broadcast time period; a reproducing step for reproducing the first program data during the broadcast time period; a caching step for caching the first additional data until the start of the broadcast time period when the multiplexed data including the first additional data is received during the predetermined time period in the receiving step; and a using step for using the cached first additional data when the first additional data has been cached in the caching step.

Thereby, when starting to be received before the start of broadcast time period, the first additional data can be cached before the start of the broadcast time period of the first program data, and the cached first additional data can be used during the broadcast time period.

Accordingly, the first additional data can start to be used at the start of the broadcast time period.

On the other hand, when the first additional data starts to be received after the start of the broadcast time period, the received first additional data can be used.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows an example program broadcast schedule held in a broadcast schedule holding unit in the embodiment;

FIG. 5 shows additional data included in multiplexed data which is broadcast in a time period 303 shown in FIG. 3;

FIG. 6 shows additional data included in multiplexed data which is broadcast in a time period 301 shown in FIG. 3;

DESCRIPTION OF THE PREFERRED EMBODIMENT

<Overview>

The preferred embodiment of the present invention relates to a data transmission/reception system including the following broadcast apparatus and reception apparatus. The broadcast apparatus multiplexes program data of a program to be reproduced by a reception apparatus and additional data for characters to be displayed with the program, and broadcasts them. The reception apparatus receives the program data and the additional data and displays them together.

Here, the broadcast apparatus multiplexes program data with additional data, from before the start of a CM program to the end of the CM program. The broadcast apparatus also multiplexes the program data with an instruction to accumulate the additional data, before the start of the CM program. The broadcast apparatus further multiplexes the program data with an instruction to display characters with the CM program, after the start of the CM program.

The reception apparatus accumulates the additional data before the start of the CM program, and displays the characters with the CM program using the accumulated additional data after the CM program starts, in accordance with the multiplexed instructions.

With this construction, the characters can be displayed with the CM program from the start of the CM program, without delay.

In the embodiment, in order to reduce the load of multiplexing operations, a main program is multiplexed with its additional data only from the start of the main program to a multiplex start time for additional data of a program to be broadcast immediately after the main program (such a thing is hereinafter referred to as "succeeding" one). If there is no succeeding program or if there is no additional data corresponding to the succeeding program, the main program is multiplexed with its additional data from the start to the end of the main program.

A multiplex start time for additional data of a CM program varies depending on whether a main program or another CM program is broadcast immediately before the CM program.

Specifically, when another CM program is broadcast immediately before the CM program (such a thing is hereinafter referred to as "preceding" one), the broadcast apparatus starts multiplexing for the CM program additional data, at the start of the preceding CM program. On the other hand, when a main program is broadcast immediately before the CM program, the broadcast apparatus starts the multiplexing operation for the CM program additional data a predetermined time period before the start of the CM program.

Also, in this embodiment, a broadcast bandwidth is fixed. So, a broadcast bandwidth for additional data of one program is the same as a broadcast bandwidth for additional data of a plurality of programs.

<Construction>

Figure 1:
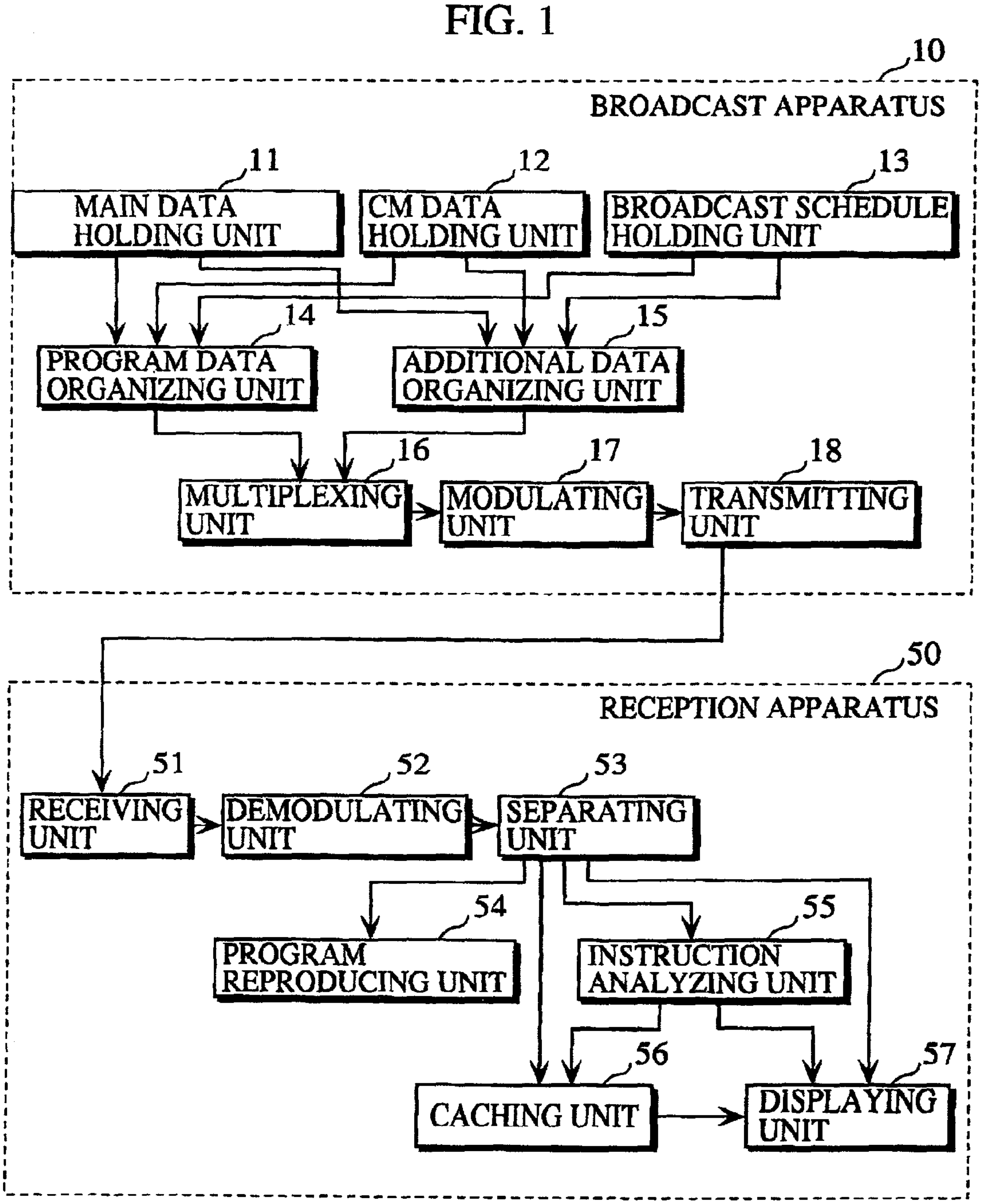
FIG. 1 shows a construction of a data broadcast system related to an embodiment of the present invention.

FIG. 1 shows a construction of a data broadcast system related to the present embodiment.

The data broadcast system shown in FIG. 1 is roughly made up of a broadcast apparatus 10 and a reception apparatus 50.

The broadcast apparatus 10 is equipped in a broadcasting station or the like to broadcast program data and additional data. This broadcast apparatus 10 includes a main data holding unit 11, a CM data holding unit 12, a broadcast schedule holding unit 13, a program data organizing unit 14, an additional data organizing unit 15, a multiplexing unit 16, a modulating unit 17, and a transmitting unit 18.

The main data holding unit 11 holds program data of a plurality of main programs and additional data of the plurality of main programs in correspondence. Here, the main programs refer to relatively long programs of several tens of minutes to several hours.

It is assumed here that the main data holding unit 11 holds main program data A to Z (MP A to Z in FIGS. 2 and 3, their management codes are "M1001" to "M1026") of main programs A to Z, and main program additional data A to Z (MPA A to Z in FIGS. 2 and 3, their management codes are "MA1001" to "MA1026") of the main programs A to Z. The program data of each program is divided so as to allow CM programs to be inserted. For example, the main program data A is divided into main program data A-1 of a main program A-1 and main program data A-2 of a main program A-2 (MP A-1 and MP A-2 in FIGS. 2 and 3, their management codes are "M1001-1" and "M1001-2").

The CM data holding unit 12 holds program data of a plurality of CM programs and additional data of the plurality of CM programs in correspondence. Here, the CM programs refer to relatively short programs of several tens of seconds to several minutes. They are inserted between main programs and broadcast.

It is assumed here that the CM data holding unit 12 holds CM program data A to Z (CM A to Z in FIGS. 2 and 3, their management codes are "C1001" to "C1026",) of CM programs A to Z and CM additional data A to Z (CMA A to Z in FIGS. 2 and 3, their management codes are "CA1001" to "CA1026") of the CM programs A to Z.

The broadcast schedule holding unit 13 holds a broadcast schedule of programs.

FIG. 2 shows an example program broadcast schedule held in the broadcast schedule holding unit 13.

As shown in FIG. 2, the program broadcast schedule shows a broadcast date, a channel code, a broadcast start time, a broadcast end time, a program management code, a program title, an additional data management code, and an additional data title.

Figure 3:
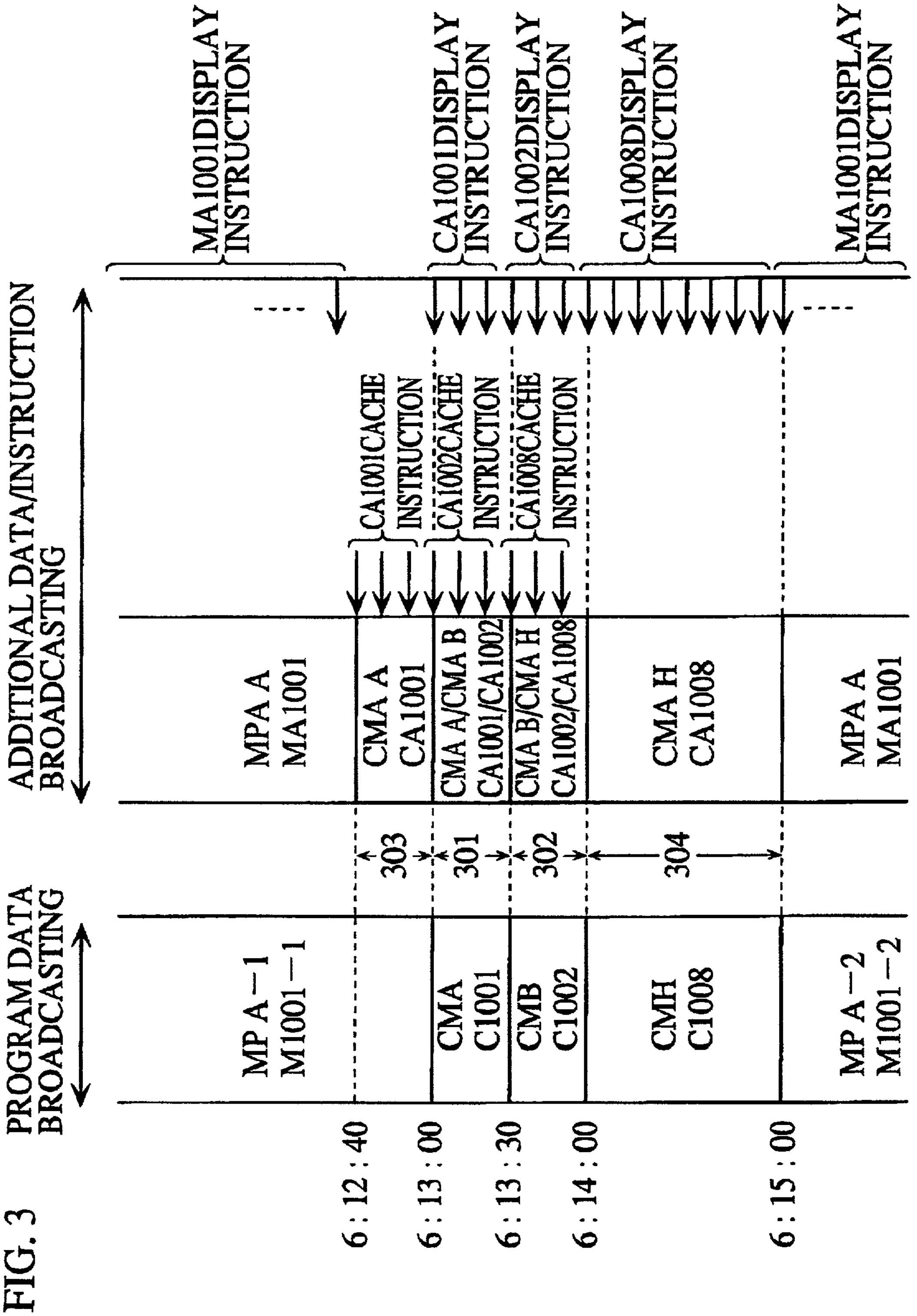
FIG. 3 shows the transmission timing of data which is broadcast by the broadcast apparatus.

FIG. 3 shows the transmission timing of data which is broadcast by the broadcast apparatus 10. The vertical direction represents time, with the passage of time being shown from top to bottom. The horizontal direction represents bandwidths. As illustrated, the bandwidth of program data broadcasting and the bandwidth of additional data broadcasting are constant in predetermined bandwidths.

Here, although instruction broadcasting is performed intermittently, the total bandwidth for the additional data broadcasting and the instruction broadcasting is assumed to be constant.

A bandwidth is defined by the number of transmitted bits per unit time (bit rate), and a predetermined bandwidth refers to a bandwidth allocated for each broadcast stream of program data and additional data of each channel.

The broadcast apparatus 10 multiplexes program data of a main or CM program with its additional data and instructions to the reception apparatus 50 and broadcasts them at the transmission timing shown in FIG. 3.

The program data organizing unit 14 organizes program data made up of video and audio data. The program data organizing unit 14 includes an EDPS (Electronic Data Processing System) which organizes program data of a long period of several weeks, and a DS (Data Server) which organizes program data of a short period of several days. According to the program broadcast schedule held in the broadcast schedule holding unit 13, the program data organizing unit 14 acquires program data of a main program scheduled to be broadcast in a time period from the main data holding unit 11, acquires program data of a CM program scheduled to be broadcast in the same time period from the CM data holding unit 12, and inserts the CM program data within the main program data so as to organize program data in which the main and CM program data is arranged in the scheduled broadcast order. Such program data organized by the program data organizing unit 14 is hereinafter called "complete program data".

The additional data organizing unit 15 organizes additional data corresponding to each program. The additional data organizing unit 15 includes a data broadcast organizing server. The additional data organizing unit 15 acquires additional data (sub additional data) corresponding to each part of complete program data (sub program data), which shows continuous contents, from the main data holding unit 11 and the CM data holding unit 12. The sub program data here is sub program data of a main program or sub program data of a CM program. The sub program data of the main program is a part of the program data of the main program, which is obtained when the sub program data of the CM program is inserted. In other words, the sub program data of the main program is program data which is broadcast from the broadcast start time of the main program data or the broadcast end time of the preceding CM program data to the broadcast end time of the main program data or the broadcast start time of the succeeding CM program data. The sub program data of the CM program is the CM program data itself.

The multiplexing unit 16 generates multiplexed data by multiplexing the complete program data organized by the program data organizing unit 14, with the additional data organized by the additional data organizing unit 15 and instructions.

Figure 4:
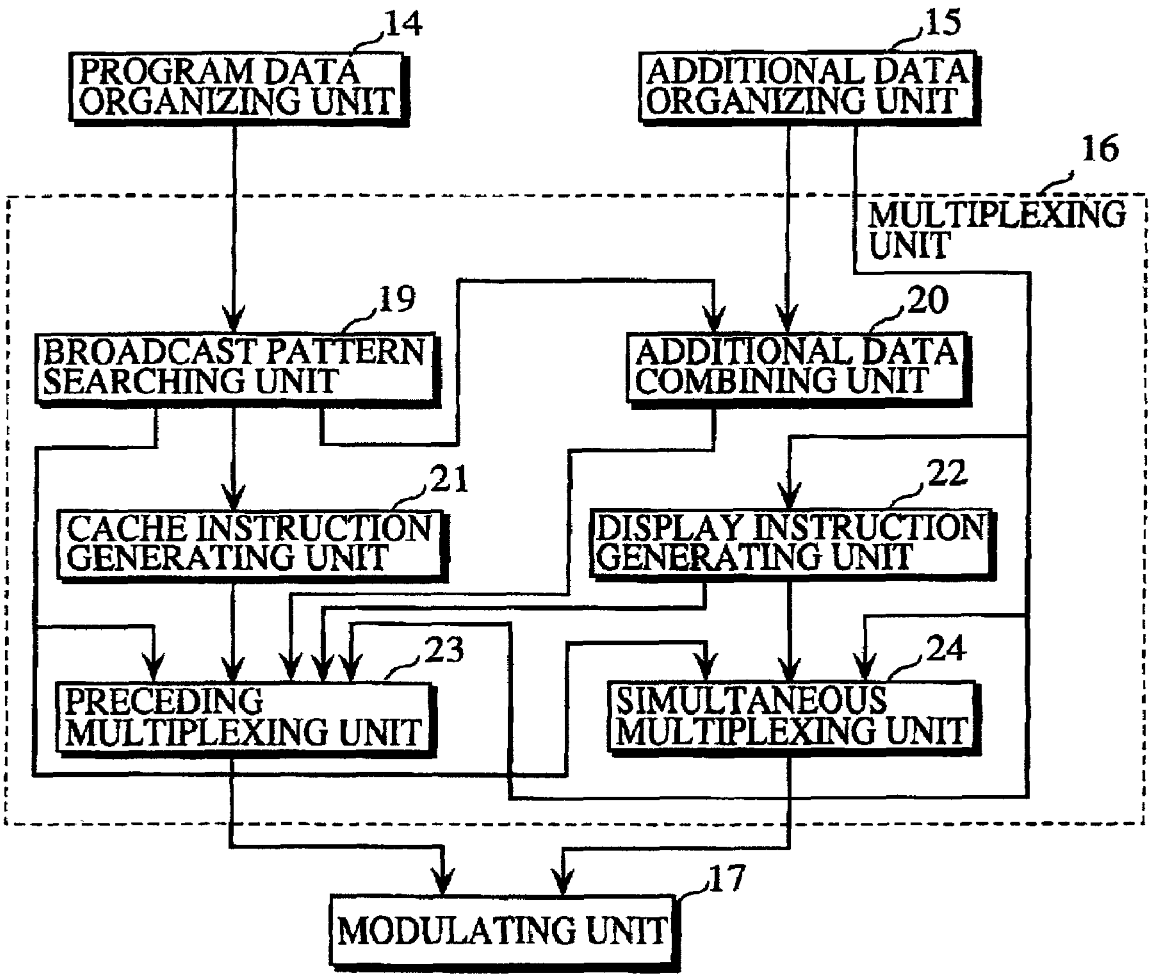
FIG. 4 shows a detailed construction of a multiplexing unit included in the broadcast apparatus of the embodiment.

FIG. 4 shows a detailed construction of the multiplexing unit 16 included in the broadcast apparatus 10 of the embodiment.

As shown in FIG. 4, the multiplexing unit 16 includes a broadcast pattern searching unit 19, an additional data combining unit 20, a cache instruction generating unit 21, a display instruction generating unit 22, a preceding multiplexing unit 23, and a simultaneous multiplexing unit 24.

The broadcast pattern searching unit 19 searches the complete program data organized by the program data organizing unit 14, for (a) a first pattern in which sub program data of a CM program is followed by sub program data of another CM program and (b) a second pattern in which sub program data of a main program is followed by sub program data of a CM program. In FIG. 2, the broadcast pattern searching unit 19 finds the first pattern in 201, 202, 203, 204, 205, and 206, and the second pattern in 207 and 208.

The additional data combining unit 20 generates combined sub additional data by combining sub additional data of a CM program to be broadcast earlier in a first pattern and sub additional data of a CM program to be broadcast later in the first pattern, in a distinguishable state, when the broadcast pattern searching unit 19 finds a first pattern. In FIG. 2, for example, the additional data combining unit 20 combines the CM additional data A an B, the CM additional data B and G, the CM additional data A and B, the CM additional data B and H, the CM additional data A and B, and the CM additional data B and F, for the first pattern pairs 201, 202, 203, 204, 205, 206, respectively. Here, the additional data combining unit 20 may generate combined sub additional data of three or more sets of sub additional data by combining combined sub additional data and sub additional data, or combining combined sub additional data and combined sub additional data.

The cache instruction generating unit 21 generates a cache instruction to instruct the reception apparatus 50 to accumulate (hereinafter referred to as "to cache") sub additional data before the broadcast start time of its corresponding sub program data. More specifically, the cache instruction generating unit 21 generates a cache instruction to instruct the reception apparatus 50 to cache the sub additional data, which is included in combined sub additional data and is not to be broadcast immediately. The cache instruction generating unit 21 also generates a cache instruction to instruct the reception apparatus 50 to cache sub additional data of a CM program to be broadcast later in a second pattern when the broadcast pattern searching unit 19 finds a second pattern, which is to be broadcast after a main program, when the broadcast pattern searching unit 19 finds a second pattern. The cache instruction may define the timing of caching of specified sub additional data, as when the reception apparatus 50 receives it or when a timer of the reception apparatus 50 recognizes a specified execution time. It is assumed here that the reception apparatus 50 is to cache sub additional data upon receiving it. In FIG. 2, for example, the cache instruction generating unit 21 generates instructions to cache the CM additional data B (its management code CA1002), the CM additional data G (its management code CA1007), the CM additional data H (its management code CA1008), the CM additional data F (its management code CA1006), and the CM additional data A (its management code CA1001).

The display instruction generating unit 22 generates a display instruction to instruct the reception apparatus 50 to display characters with sub program data using its sub additional data during a reproduction time period of the sub program data. In FIG. 2, for example, the display instruction generating unit 22 generates instructions to display the CM additional data A (its management code CA1001), the CM additional data B (its management code CA1002), the CM additional data G (its management code CA1007), the main program additional data A (its management code MA1001), the CM additional data H (its management code CA1008), and the CM additional data F (its management code CA1007).

The preceding multiplexing unit 23 repeatedly multiplexes, during the broadcast time period of sub program data of a CM program to be broadcast earlier in each first pattern (e.g. 301 or 302 in FIG. 3), this sub program data with combined sub additional data generated by the additional data combining unit 20, a display instruction for sub additional data corresponding to the sub program data to be broadcast earlier in the first pattern, and a cache instruction for sub additional data corresponding to sub program data to be broadcast later in the first pattern. This multiplexing is performed so that the total bandwidth for the combined sub additional data, the display instruction, and the cache instruction is a predetermined bandwidth. Also, the preceding multiplexing unit 23 repeatedly multiplexes, during a predetermined time period before the broadcast end time of sub program data of a main program to be broadcast earlier in each second pattern (e.g. 303 in FIG. 3), this sub program data with sub additional data corresponding to sub program data of a CM program to be broadcast later in the second pattern and a cache instruction for the sub additional data of the CM program. This multiplexing is also performed so that the total bandwidth for the sub additional data and the cache instruction is the predetermined bandwidth. Specifically, in the time period 301 in FIG. 3 (from 6:13:00 to 6:13:30), the preceding multiplexing unit 23 repeatedly multiplexes the CM program data A with combined sub additional data which is made up of the CM additional data A and B, a display instruction for the CM additional data A, and a cache instruction for the CM additional data B, on the predetermined bandwidth in total. In the time period 302 in FIG. 3 (from 6:13:30 to 6:14:00), the preceding multiplexing unit 23 repeatedly multiplexes the CM program data B with combined sub additional data which is made up of the CM additional data B and H, a display instruction for the CM additional data B, and a cache instruction for the CM additional data H, on the predetermined bandwidth in total. In the time period 303 in FIG. 3 (from 6:12:40 to 6:13:00), namely in the last twenty seconds of the broadcast time period of the main program data A-1, the preceding multiplexing unit 23 repeatedly multiplexes the CM additional data A with a cache instruction for the CM additional data A, on the predetermined bandwidth in total.

FIG. 5 shows additional data included in multiplexed data which is to be broadcast in the time period 303 in FIG. 3.

"proc1" instructs to cache a module which is specified by an argument, and "proc2" instructs to display a module which is specified by an argument below.

A repeat transmission definition 501 specifies a method, a time, and the like for transmitting "repeat transmission data 1" which is equivalent to the whole additional data.

A module definition 502 shows the contents of "module 1" which is equivalent to the CM additional data A and specifies character strings to be displayed with the CM program A.

An event message definition 503 indicates that a reception apparatus is to cache the "module 1" on receiving "event message 1".

An event message definition 504 indicates that a reception apparatus is to display the "module 1" on receiving "event message 2".

An event message definition 505 indicates that a reception apparatus is to cache "module 2" on receiving "event message 3".

FIG. 6 shows additional data included in multiplexed data which is to be broadcast in the time period 301 in FIG. 3.

A repeat transmission definition 601 specifies a method, a time, and the like for transmitting "repeat transmission data 1" which is equivalent to the whole additional data.

A module definition 602 shows the contents of "module 1" which is equivalent to the CM additional data A and specifies character strings to be displayed with the CM program A.

A module definition 603 shows the contents of "module 2" which is equivalent to the CM additional data B and specifies character strings to be displayed with the CM program B.

An event message definition 604 indicates that a reception apparatus is to display the "module 1" on receiving the "event message 2".

An event message definition 605 indicates that a reception apparatus is to cache the "module 2" on receiving "event message 3".

An event message definition 606 indicates that a reception apparatus is to display the "module 2" on receiving "event message 4".

The simultaneous multiplexing unit 24 repeatedly multiplexes sub additional data which is not subjected to multiplex by the preceding multiplexing unit 23 and a display instruction for the sub additional data with its corresponding sub program data. This multiplexing is performed for sub additional data which is to be broadcast later in each first pattern and whose corresponding CM program is followed by a main program, from the start of the CM program to a multiplex start time of sub additional data of the succeeding main program (e.g. 304 in FIG. 3). Here, this multiplexing is performed so that the total bandwidth for the sub additional data and the display instruction is allocated to the predetermined bandwidth. During the broadcast time period of sub program data of a CM program to be broadcast earlier in each first pattern (e.g. 301 or 302 in FIG. 3), the simultaneous multiplexing unit 24 does not perform multiplexing operations because the preceding multiplexing unit 23 does. In the time period 304 in FIG. 3, the simultaneous multiplexing unit 24 repeatedly multiplexes CM program data H with the CM additional data H and a display instruction to display the CM additional data H so that the total bandwidth for the CM additional data H and the display instruction is allocated to the predetermined bandwidth.

Figure 7:
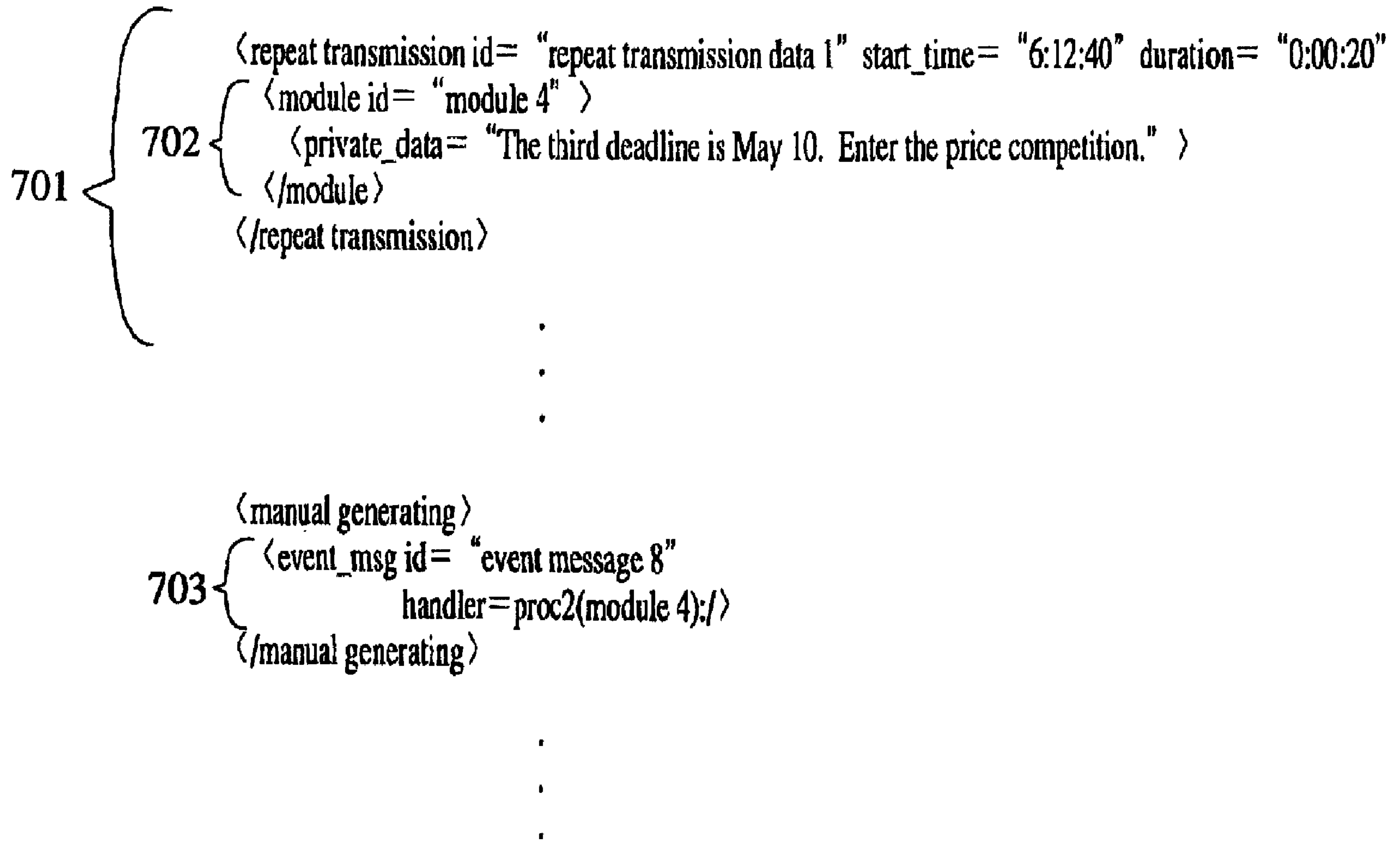
FIG. 7 shows additional data included in multiplexed data which is broadcast in a time period 304 shown in FIG. 3.

FIG. 7 shows additional data included in multiplexed data which is broadcast in the time period 304 in FIG. 3.

A repeat transmission definition 701 specifies a method, a time, and the like for transmitting "repeat transmission data 1" which is equivalent to the whole additional data.

A module definition 702 shows the contents of "module 4" which is equivalent to the CM additional data H and specifies character strings to be displayed with the CM program H.

An event message definition 703 indicates that a reception apparatus is to display the "module 4" on receiving "event message 8".

The modulating unit 17 generates a broadcast wave by modulating a predetermined frequency carrier using the multiplexed data generated by the multiplexing unit 16 as a modulating signal.

The transmitting unit 18 broadcasts the broadcast wave generated by the modulating unit 17.

The reception apparatus 50 is a digital TV, a set top box, or the like, which is set in home to receive broadcast waves and reproduce programs. The reception apparatus 50 includes a receiving unit 51, a demodulating unit 52, a separating unit 53, a program reproducing unit 54, an instruction analyzing unit 55, a caching unit 56, and a displaying unit 57.

The receiving unit 51 is a parabolic antenna, a tuner, or the like, which tunes in and receives a desired broadcast wave.

The demodulating unit 52 demodulates the broadcast wave received by the receiving unit 51 and extracts the multiplexed data.

The separating unit 53 is a TS (Transport Stream) decoder or the like, which separates the multiplexed data extracted by the demodulating unit 52 into program data, additional data, a cache instruction, and a display instruction.

The program reproducing unit 54 is a AV decoder, a monitor, a speaker, or the like, which reproduces video and audio of a program using the data separated by the separating unit 53.

The instruction analyzing unit 55 analyzes the cache instruction and the display instruction, which are separated by the separating unit 53, and instructs the caching unit 56 and the displaying unit 57 to perform respective operations. For example, in the time period 303 in FIG. 3, the instruction analyzing unit 55 receives "event message 1", which is an instruction to perform "event 1". The "event 1" is defined as caching the CM additional data A. The instruction analyzing unit 55 then instructs the caching unit 56 to cache the CM additional data A. In the time period 301 in FIG. 3, the instruction analyzing unit 55 receives "event message 2", which is an instruction to perform "event 2". The "event 2" is defined as displaying the CM additional data A. The instruction analyzing unit 55 then instructs the displaying unit 57 to display the CM additional data A.

When the instruction analyzing unit 55 instructs the caching unit 56 to perform a caching operation, the caching unit 56 caches additional data specified by the cache instruction in a memory. The specified additional data is selected by the instruction analyzing unit 55 from the additional data separated by the separating unit 53. For example, in the time period 303 in FIG. 3, the caching unit 56 caches the CM additional data A defined as the "module 1", based on the definition of the "event 1".

On the other hand, when the instruction analyzing unit 55 instructs the displaying unit 57 to perform a displaying operation, the displaying unit 57 displays characters with the video of the program reproduced by the program reproducing unit 54 using (a) the additional data cached by the caching unit 56 and (b) the additional data specified by the instruction analyzing unit 55. For example, in the time period 301 in FIG. 3, the displaying unit 57 displays the characters included in the CM additional data A defined as the "module 2", based on the definition of the "event 2".

<Operation>

The following explains a broadcast wave transmitting operation performed by the broadcast apparatus 10 of this embodiment.

Figure 8:
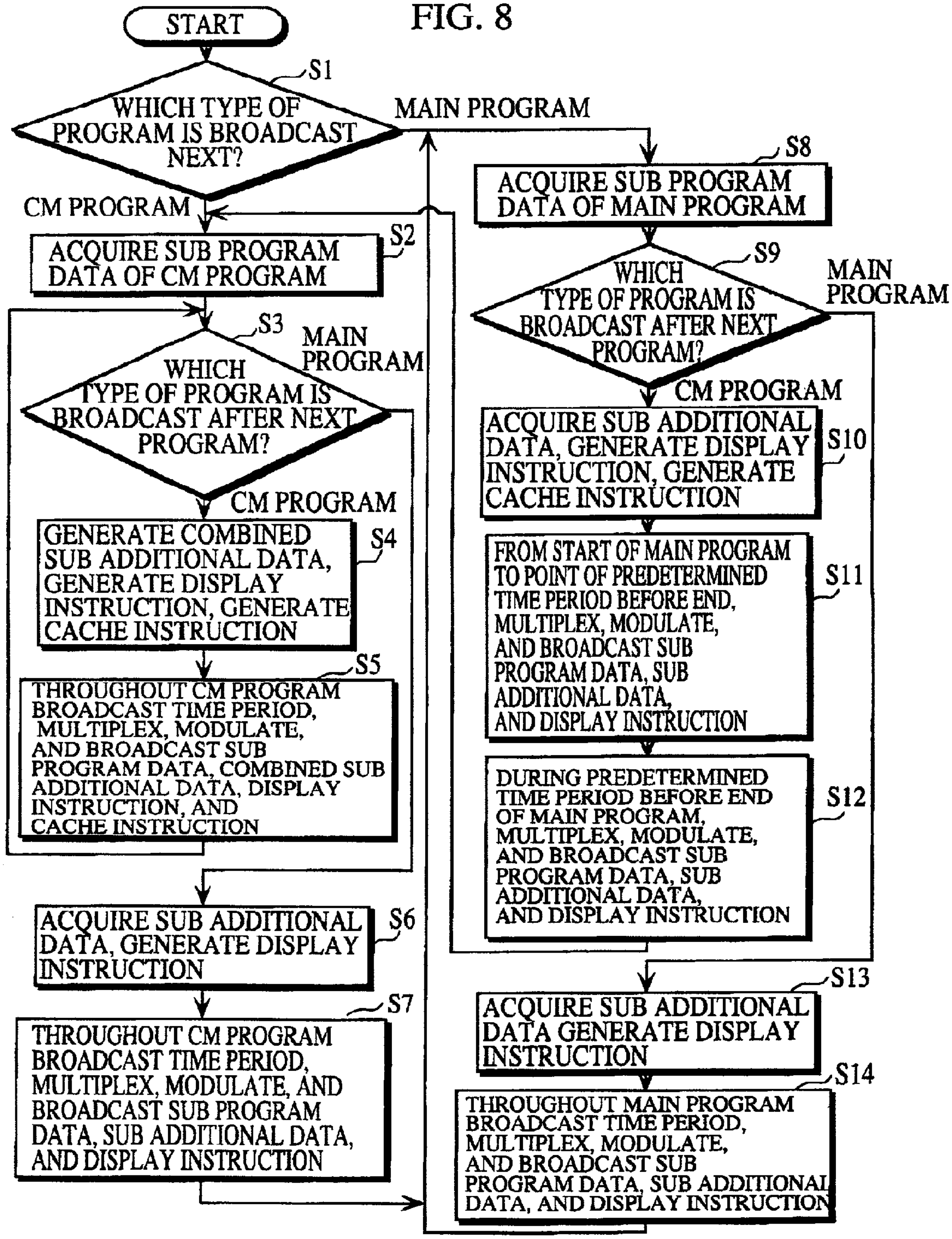
FIG. 8 shows an example broadcast wave transmitting operation performed by the broadcast apparatus of the embodiment.

FIG. 8 shows an example broadcast wave transmitting operation performed by the broadcast apparatus 10.

Here, although additional data and instructions of a certain broadcast time period can be multiplexed with program data in advance and broadcast, it is assumed here that additional data and instructions are multiplexed with program data each time and broadcast.

(1) According to a program broadcast schedule held in the broadcast schedule holding unit 13, the program data organizing unit 14 of the broadcast apparatus 10 judges whether a program to be broadcast next (next program) is a main program or a CM program (Step S1).

(2) When the next program is a CM program (judgement in S1: CM or after S12), the program data organizing unit 14 acquires sub program data of the next CM program from the CM data holding unit 12 (Step S2).

(3) The program data organizing unit 14 judges whether a program to be broadcast after the next CM program is a main program or a CM program (Step S3).

(4) When the program to be broadcast after the next CM program is a CM program (judgement in S3: CM=first pattern), (a) the additional data combining unit 20 generates combined sub additional data by acquiring and combining sub additional data corresponding to sub program data of the pair of CM programs to be continuously broadcast, (b) the display instruction generating unit 22 generates a display instruction to display sub additional data of the former CM program, and (c) the cache instruction generating unit 21 generates a cache instruction to cache sub program data of the latter CM program (Step S4).

(5) Throughout the broadcast time period of the former CM program, the combined sub additional data, the display instruction, and the cache instruction, which are generated in Step S4, and sub program data of the former CM program are multiplexed, modulated, and broadcast (Step S5).

(6) When a program to be broadcast after the next CM program is a main program (judgement in S3: main program), (a) the program data organizing unit 14 acquires sub additional data corresponding to sub program data of the next CM program from the CM data holding unit 12, and (b) the display instruction generating unit 21 generates a display instruction to display the acquired sub additional data (Step S6).

(7) Throughout the broadcast time period of the next CM program, the sub additional data acquired in Step S6, the display instruction generated in Step S6, and the sub program data of the next CM program are multiplexed, modulated, and broadcast (Step S7).

Now the program to be broadcast after the next program in Step S6 becomes a program to be broadcast next (next program). Go on to Step S8.

(8) When the next program is a main program (judgement in S1: main program or after S7/S14), the program data organizing unit 14 acquires sub program data of the next main program from the main data holding unit 11 (Step S8).

(9) The program data organizing unit 14 judges whether a program to be broadcast after the next main program is a main program or a CM program (Step S9).

(10) When the program to be broadcast after the next main program is a CM program (judgement in S9: CM=second pattern), (a) the additional data combining unit 20 acquires sub additional data corresponding to sub program data of the next main program from the main data holding unit 11, (b) the display instruction generating unit 22 generates a display instruction to display the acquired sub additional data, (c) the additional data combining unit 20 acquires sub additional data corresponding to sub program data of the CM program to be broadcast after the next main program from the CM program data holding unit 12, and (d) the cache instruction generating unit 21 generates a cache instruction to cache the acquired sub program data of the CM program to be broadcast after the next main program (Step S10).

(11) From the start of the next main program to a point of a predetermined time period before the end of the next main program, (a) the sub program data of the next main program, (b) the sub additional data corresponding to the sub program data of the next main program, and (c) the display instruction generated in Step 10 are multiplexed, modulated, and broadcast (Step S11).

(12) During the predetermined time period before the end of the next main program, (a) the sub program data of the next main program, which is being broadcast, (b) the sub additional data corresponding to the sub program data of the CM program to be broadcast after the next main program, which is acquired in Step 10, and (c) the display instruction generated in Step 10 are multiplexed, modulated, and broadcast (Step S12).

Now, the CM program to be broadcast after the next main program in Step S12 becomes a CM program to be broadcast next (next CM program). Go on to Step S2.

(13) When the program to be broadcast after the next main program is a main program (judgement in S9: main program), (a) the program data organizing unit 14 acquires sub additional data corresponding to sub program data of the next main program, from the main data holding unit 11, and (b) the cache instruction generating unit 21 generates a cache instruction to cache the acquired sub additional data (Step S13).

(14) Throughout the broadcast time period of the next main program, the sub program data of the next main program and the display instruction generated in Step 13 are multiplexed, modulated, and broadcast (Step S14).

Now, the main program to be broadcast after the next main program in Step S13 becomes a main program to be broadcast next (next main program). Go on to Step S8.

Figure 9:
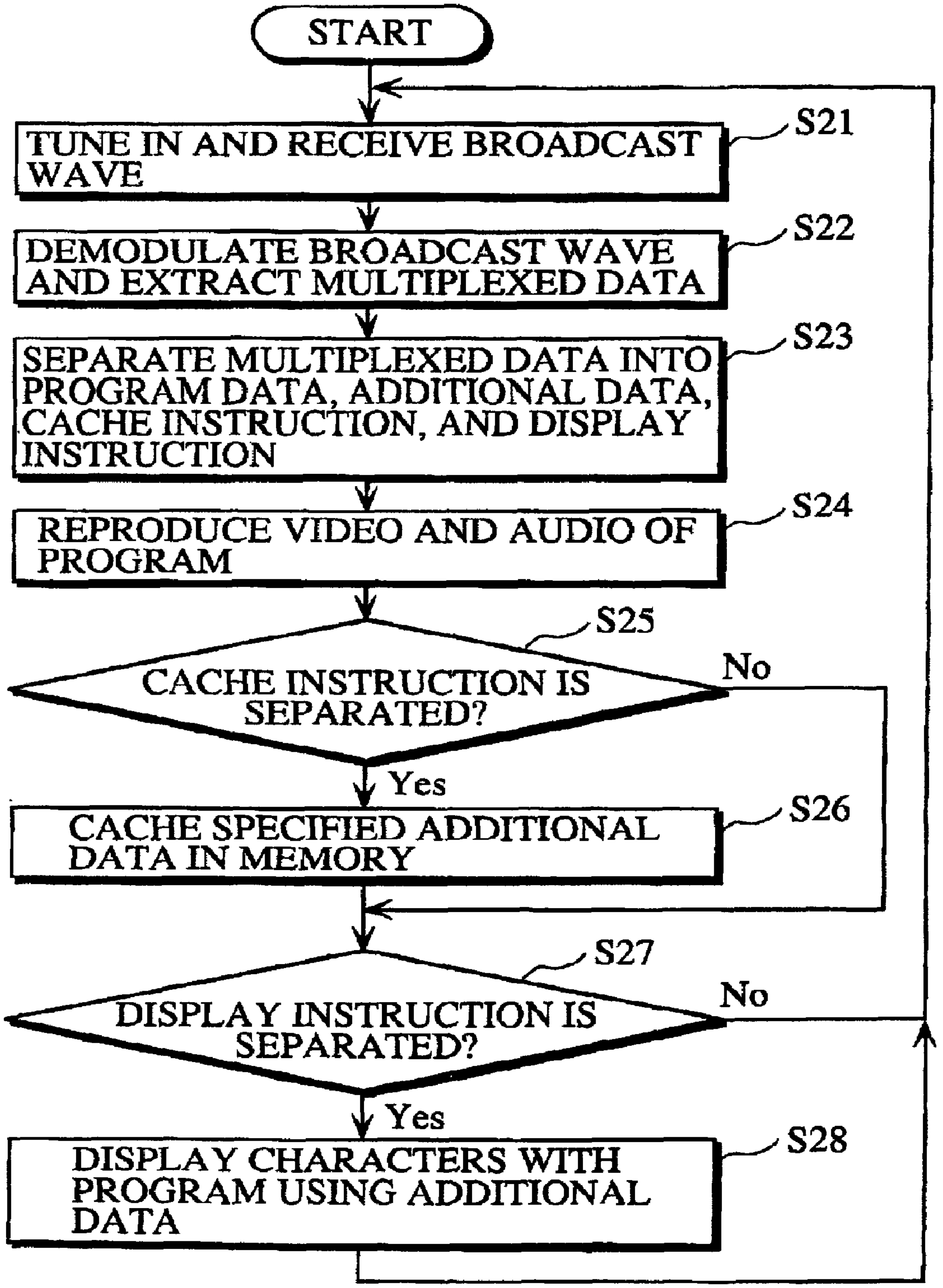
FIG. 9 shows an example receiving operation performed by a reception apparatus of the embodiment.

FIG. 9 shows an example receiving operation performed by the reception apparatus 50.

(1) The receiving unit 51 tunes in and receives a desired broadcast wave (Step S21).

(2) The demodulating unit 52 demodulates the broadcast wave received by the receiving unit 51 and extracts multiplexed data (Step S22).

(3) The separating unit 53 separates the multiplexed data extracted by the demodulating unit 52 into program data, additional data, a cache instruction, and a display instruction (Step S23).

(4) The program reproducing unit 54 reproduces video and audio of a program using the program data separated by the separating unit 53 (Step S24).

(5) The instruction analyzing unit 55 judges whether a cache instruction is separated from the multiplexed data extracted by the demodulating unit 52 (Step S25). When a cache instruction is not separated, skip a caching operation (Step S26) and go on to Step S27.

(6) When a cache instruction is separated, the caching unit 56 caches additional data specified by the cache instruction in a memory. The specified additional data is selected from the additional data separated by the separating unit 53 (Step S26).

(7) The instruction analyzing unit 55 judges whether a display instruction is separated from the multiplexed data extracted by the demodulating unit 52 (Step S27). When a display instruction is not separated, skip a displaying operation (Step S28) and return to Step S1.

(8) When a display instruction is separated, the displaying unit 57 displays characters with the video of the program being reproduced by the program reproducing unit 54 using (a) the additional data cached by the caching unit 56 and (b) the specified additional data selected from the additional data separated by the separating unit 53. Return to Step S1 (Step S28).

In this way, according to this embodiment, from before the start of a CM program to the end of the CM program, the broadcast apparatus multiplexes program data with additional data, a cache instruction to cache the additional data before the start of the CM program, and a display instruction to display characters with the CM program after the start of the CM program, and the broadcast apparatus then broadcasts them. In addition, according to the multiplexed instructions, the reception apparatus caches the additional data before the start of the CM program and display the characters with the CM program using the cached additional data after the start of the CM program. Accordingly, the reception apparatus can display the characters to be displayed with the CM program in time for the start of the CM program. That is, the reception apparatus does not keep viewers waiting for display.

Here, although additional data refers to characters to be displayed with a program in this embodiment, any kind of data to be simultaneously used with a program such as still video data, moving video data, audio data, and other operating instructions to a reception apparatus may be replaced.

In this embodiment, additional data of a main program starts to be multiplexed with program data of the main program at the start of the main program. This is based on an assumption that a broadcast time period of a main program is so long that no inconvenience will result if characters included in the additional data are not displayed with the program data for several seconds at the start of the main program due to a waiting time in which the additional data is received, processed and displayed. Also, in this embodiment, additional data of a main program is stopped being multiplexed with program data of the main program at a multiplex start time for additional data of the succeeding program. This is based on an assumption that a broadcast time period of a main program is so long that no inconvenience will result if characters included in the additional data are not presented with the program data to a user who only starts to receive the data for the last several seconds at the end of the main program.

These can simplify multiplexing operations and reduce the load of them. However, multiplexing for additional data of a main program may be performed in the same way as that for additional data of a CM program.

Also, the predetermined time period need not be determined in advance. The time period may be determined by an indication by an outside.

Moreover, in this embodiment, a multiplex start time for additional data of a CM program varies depending on whether the preceding program is a CM program or a main program in order to simplify multiplexing operations for continuous CM programs and reduce the load of them. However, the multiplex start time may be fixed.

Furthermore, in this embodiment, a multiplex start time for additional data varies depending on whether the additional data is for a CM program or a main program. However, it may vary depending on whether a display time period of sub program data is longer than a predetermined criterion time period. In this case, the multiplexing unit further includes a broadcast time period judging unit which judges a time period in which sub program data is displayed by a reception apparatus is longer than a predetermined criterion time period. When the broadcast time period judging unit judges that the display time period of the sub program data is no longer than the predetermined criterion time period, the sub additional data is treated in the same way as that of a CM program in this embodiment; otherwise, in the same way as that of a main program in this embodiment.

Additionally, although additional data is always multiplexed with program data in this embodiment, additional data may be multiplexed not with program data but only with an instruction to the reception apparatus at each transmission time determined based on a reproduction start time of the additional data, and broadcast. In this case, the transmission timing of the sub additional data may vary depending on whether a reproduction time period of the sub additional data is longer than a predetermined criterion time period.

Also, a criterion for showing a threshold value of a broadcast time period of the preceding program in order to determine a multiplex start time for additional data (hereinafter called "first criterion") may differ from a criterion for showing a threshold value of a broadcast time period of a program in order to judge whether characters may not be displayed for several seconds at the start and the end of the broadcast time period (hereinafter called "second criterion"). In this case, the multiplexing unit further includes (a) a short program judging unit which judges whether a display time period in which video is reproduced by the reception apparatus using sub program data is no longer than a predetermined first criterion and (b) a long program judging unit which judges whether the display time period is longer than a predetermined second criterion.

Sub additional data may be updated during a broadcast time period of its corresponding sub program data. In this case, a multiplex start time for additional data varies depending on a broadcast time period of the preceding program in this embodiment. However, the multiplex start time may vary depending on a time period from the most recent update time of the preceding additional data corresponding to the preceding program data to the end of the preceding program. In this embodiment, characters are not displayed for several seconds at the start and the end of a program when a broadcast time period of the program is long enough. However, it may be assumed that characters are not displayed for several seconds at the start of a program when a time period from the start of the program to the first update time of additional data of the program is long enough. Also, it may be assumed that characters are not displayed for several seconds at the end of a program when a time period from the last update time of additional data of the program to the end of the program is long enough.

The first criterion and the second criterion depend on a time period of a broadcast cycle of sub additional data. Therefore, the broadcast apparatus may further include a criterion determining unit which determines a first criterion to be used by the short program judging unit and a second criterion to be used by the long program judging unit, by multiplying the time period of a broadcast cycle of sub additional data by each predetermined coefficient.

The first criterion may be determined not by a broadcast time period of a program but by an indication by an outside. For example, a user may determine whether a multiplex start time for additional data is before or at the start of a program and instruct the broadcast apparatus to follow that. In the same way, a user may determine whether additional data continue to be subjected to multiplex until the start of the succeeding program and instruct the broadcast apparatus to follow that.

Although a predetermined bandwidth is allocated for additional data broadcasting and instruction broadcasting in total in this embodiment, the bandwidth need not be fixed.

For example, a total bandwidth for multiplexed data is not allocated to a predetermined bandwidth. Instead, the total bandwidth may be increased by adding a bandwidth for additional data which is additionally multiplexed to the predetermined bandwidth.

The caching unit may perform caching by accumulating additional data, which is being broadcast by radio broadcasting, such as satellite broadcasting and terrestrial broadcasting, or cable broadcasting, such as cable television broadcasting and internet broadcasting, (a) in a storage medium connected to a reception apparatus, such as a hard disc drive, a recordable compact disc drive, a rewritable compact disc drive, an magnet-optical disc drive, a recordable DVD drive, a rewritable DVD drive, a DVD-RAM drive, a floppy disc drive, a memory card, or (b) in a storage medium included in a reception apparatus, such as a hard disc and a main memory. Also, the caching unit may perform caching by copying additional data, which is stored in the above storage medium or which is prestored in a storage medium of a supplement to a magazine, to a high-speed processing memory, such as an on-board cache memory and an on-chip cache memory.

Additionally, computer programs to have a computer perform the processing of the above embodiment may be recorded on computer-readable recording media and sold.

These recording media can be, for instance, a floppy disc, a compact disc, a recordable compact disc, a rewritable compact disc, a magnet-optical disc, a recordable DVD disc, a rewritable DVD disc, a DVD-RAM, and a memory card, all of which allow the user to load into and remove from a computer. The recording media may be also a hard disc, a semiconductor memory, or the like that are provided in a computer in advance. The recording media are not limited to the above ones.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcast apparatus for multiplexing and broadcasting program data which is to be reproduced by a reception apparatus soon after receipt and additional data which corresponds to the program data, the broadcast apparatus comprising:

acquiring means for acquiring first program data, a first additional data group including at least first additional data corresponding to the first program data, a broadcast time period of the first program data, and second program data which is to be broadcast before the first program data;

multiplexing means for repeatedly multiplexing the first additional data group with the second program data from a specific time to a start of the broadcast time period and repeatedly multiplexing the first additional data group with the first program data during the broadcast time period, the specific time being a point in time before the start of the broadcast time period, and a time period between the specific time and the start of the broadcast time period being a predetermined time period;

broadcasting means for broadcasting the data multiplexed by the multiplexing means;

cache instruction broadcasting means for broadcasting a cache instruction before the start of the reproduction time period, the cache instruction instructing the reception apparatus to cache only the first additional data; and use instruction broadcasting means for broadcasting a use instruction after the start of the reproduction time period, the use instruction instructing the reception apparatus to use, when the first additional data has been cached according to the cache instruction, the cached additional data.

2. The broadcast apparatus of claim 1, wherein the acquiring means further acquires second additional data corresponding to the second program data, and the multiplexing means repeatedly multiplexes a second additional data group including at least the second additional data with the second program data until the specific time.

3. The broadcast apparatus of claim 2, wherein the multiplexing means performs the multiplexing for the second additional data group on a predetermined bandwidth until the specific time and performs the multiplexing for the first additional data group on the predetermined bandwidth from the specific time.

4. The broadcast apparatus of claim 1, wherein the acquiring means further acquires second additional data corresponding to the second program data, and the multiplexing means repeatedly multiplexes a second additional data group including at least the second additional data with the second program data until the start of the broadcast time period.

5. The broadcast apparatus of claim 4, wherein the multiplexing means performs the multiplexing for the second additional data on a predetermined bandwidth until the specific time and performs the multiplexing for the second additional data and the first additional data on the predetermined bandwidth from the specific time to the start of the broadcast time period.

6. The broadcast apparatus of claim 4, wherein the multiplexing means performs the multiplexing for the second additional data group on a predetermined bandwidth until the specific time and performs the multiplexing for the second additional data group on the predetermined bandwidth from the specific time to the start of the broadcast time period.

7. The broadcast apparatus of claim 1, wherein the cache instruction broadcasting means broadcasts the cache instruction to instruct the reception apparatus to perform the caching by accumulating only the first additional data, and the use instruction broadcasting means broadcasts the use instruction to instruct the reception apparatus to use, (a) when the first additional data has been accumulated according to the cache instruction, the accumulated first additional data, and (b) when the first additional data has not been accumulated according to the cache instruction, the first additional data broadcast by the broadcasting means.

8. The broadcast apparatus of claim 1, wherein the cache instruction broadcasting means broadcasts the cache instruction to instruct the reception apparatus to perform the caching by storing the first additional data into a cache memory when the first additional data has been stored in a predetermined storage medium, and the use instruction broadcasting means broadcasts the use instruction to instruct the reception apparatus to use, (a) when the first additional data has been stored in the cache memory according to the cache instruction, the first additional data stored in the cache memory, and (b) when the first additional data has not been stored in the cache memory according to the cache instruction, the first additional data stored in the predetermined storage medium.

9. The broadcast apparatus of claim 1, wherein the acquiring means further acquires second additional data corresponding to the second program data and a broadcast time period of the second program data, the broadcast apparatus further comprises judging means for judging whether the broadcast time period of the second program data is longer than a predetermined criterion time period, and the multiplexing means, (a) when the judging means judges that the broadcast time period of the second program data is longer than the predetermined criterion time period, repeatedly multiplexes the second additional data with the second program data until the specific time, repeatedly multiplexes the first additional data with the second program data from the specific time to the start of the broadcast time period of the first program data, and repeatedly multiplexes the first additional data with the first program data during the broadcast time period of the first program data, and (b) when the judging means judges that the broadcast time period of the second program data is no longer than the predetermined criterion time period, repeatedly multiplexes the second additional data with the second program data until the specific time, repeatedly multiplexes the second additional data and the first additional data with the second program data from the specific time to the start of the broadcast time period of the first program data, and repeatedly multiplexes the first additional data with the first program data during the broadcast time period of the first program data.

10. The broadcast apparatus of claim 9, wherein, when the judging means judges that the broadcast time period of the second time period of the second program data is no longer than the predetermined criterion time period, the multiplexing means repeatedly multiplexes the second additional data and the first additional data with the second program data during the broadcast time period of the second program data.

11. The broadcast apparatus of claim 9, further comprising:

criterion time period determining means for determining the predetermined criterion time period to be used by the judging means by multiplying a time period of a broadcast cycle of additional data by a predetermined coefficient.

12. The broadcast apparatus of claim 1, wherein the acquiring means further acquires second additional data corresponding to the second program data and a broadcast time period of the second program data, the broadcast apparatus further comprises judging means for judging whether the broadcast time period of the second program data is longer than a predetermined criterion time period, and the multiplexing means (a) repeatedly multiplexes the second additional data with the second program data until the specific time so that a bandwidth for the second additional data is allocated to a predetermined bandwidth, (b) when the judging means judges that the broadcast time period of the second program data is longer than the predetermined criterion time period, repeatedly multiplexes the first additional data with the second program data from the specific time to the start of the broadcast time period of the first program data so that a bandwidth for the first additional data is allocated to the predetermined bandwidth, and repeatedly multiplexes the first additional data with the first program data during the broadcast time period of the first program data, and (c) when the judging means judges that the broadcast time period of the second program data is no longer than the predetermined criterion time period, so that a total bandwidth for the second additional data and the first additional data is allocated to the predetermined bandwidth, repeatedly multiplexes the second additional data and the first additional data with the second program data from the specific time to the start of the broadcast time period of the first program data, and repeatedly multiplexes the first additional data with the first program data during the broadcast time period of the first program data.

13. The broadcast apparatus of claim 12, wherein, when the judging means judges that the broadcast time period of the second time period of the second program data is no longer than the predetermined criterion time period, the multiplexing means repeatedly multiplexes the second additional data and the first additional data with the second program data during the broadcast time period of the second program data.

14. The broadcast apparatus of claim 12, further comprising:

criterion time period determining means for determining the predetermined criterion time period to be used by the judging means by multiplying a time period of a broadcast cycle of additional data by a predetermined coefficient.

15. The broadcast apparatus of claim 1, wherein the first additional data acquiring means further acquires second additional data corresponding to the second program data and a broadcast time period of the second program data, the broadcast apparatus further comprises judging means for judging whether the broadcast time period of the second program data is longer than a predetermined criterion time period, and the multiplexing means (a) repeatedly multiplexes the second additional data with the second program data until the specific time so that a bandwidth for the second additional data is allocated to a predetermined bandwidth, (b) when the judging means judges that the broadcast time period of the second program data is longer than the predetermined criterion time period, so that a bandwidth for the first additional data is allocated to the predetermined bandwidth, repeatedly multiplexes the first additional data with the second program data from the specific time to the start of the broadcast time period of the first program data and repeatedly multiplexes the first additional data with the first program data during the broadcast time period of the first program data, and (c) when the judging means judges that the broadcast time period of the second program data is no longer than the predetermined criterion time period, repeatedly multiplexes the second additional data and the first additional data with the second program data from the specific time to the start of the broadcast time period of the first program data so that a total bandwidth for the second additional data and the first additional data is increased by adding a bandwidth for the first additional data to the predetermined bandwidth and repeatedly multiplexes the first additional data with the first program data during the broadcast time period of the first program data so that a bandwidth for the first additional data is allocated to the predetermined bandwidth.

16. The broadcast apparatus of claim 15, wherein, when the judging means judges that the broadcast time period of the second time period of the second program data is no longer than the predetermined criterion time period, the multiplexing means repeatedly multiplexes the second additional data and the first additional data with the second program data during the broadcast time period of the second program data.

17. The broadcast apparatus of claim 15, further comprising:

criterion time period determining means for determining the predetermined criterion time period to be used by the judging means by multiplying a time period of a broadcast cycle of additional data by a predetermined coefficient.

18. The broadcast apparatus of claim 1, wherein the acquiring means further acquires second additional data corresponding to the second program data and a broadcast time period of the second program data, the second additional data is updated during the broadcast time period of the second program data, the broadcast apparatus further comprises judging means for judging whether a time period from the last update time of the second additional data to the start of the broadcast time period of the first program data is longer than a predetermined criterion time period, and the multiplexing means, (a) when the judging means judges that the time period from the last update time of the second additional data to the start of the broadcast time period of the first program data is longer than the predetermined criterion time period, repeatedly multiplexes the second additional data with the second program data until the specific time, repeatedly multiplexes the first additional data with the second program data from the specific time to the start of the broadcast time period of the first program data, and repeatedly multiplexes the first additional data with the first program data during the broadcast time period of the first program data, and (b) when the judging means judges that the time period from the last update time of the second additional data to the start of the broadcast time period of the first program data is no longer than the predetermined criterion time period, repeatedly multiplexes the second additional data with the second program data until the specific time, repeatedly multiplexes the second additional data and the first additional data with the second program data from the specific time to the start of the broadcast time period of the first program data, and repeatedly multiplexes the first additional data with the first program data during the broadcast time period of the first program data.

19. The broadcast apparatus of claim 18, wherein, when the judging means judges that the time period from the last update time of the second additional data to the start of the broadcast time period of the first program data is no longer than the predetermined criterion time period, the multiplexing means repeatedly multiplexes the second additional data and the first additional data with the second program data during the time period from the last update time of the second additional data to the start of the broadcast time period of the first program data.

20. The broadcast apparatus of claim 18, further comprising:

criterion time period determining means for determining the predetermined criterion time period to be used by the judging means by multiplying a time period of a broadcast cycle of additional data by a predetermined coefficient.

21. The broadcast apparatus of claim 1, wherein the acquiring means further acquires second additional data corresponding to the second program data and a broadcast time period of the second program data, the second additional data is updated during the broadcast time period of the second program data, the broadcast apparatus further comprises judging means for judging whether a time period from the last update time of the second additional data to the start of the broadcast time period of the first program data is longer than a predetermined criterion time period, and the multiplexing means (a) repeatedly multiplexes the second additional data with the second program data until the specific time so that a bandwidth for the second additional data is allocated to a predetermined bandwidth, (b) when the judging means judges that the time period from the last update time of the second additional data to the start of the broadcast time period of the first program data is longer than the predetermined criterion time period, repeatedly multiplexes the first additional data with the second program data from the specific time to the start of the broadcast time period of the first program data so that a bandwidth, for the first additional data is allocated to the predetermined bandwidth and repeatedly multiplexes the first additional data with the first program data during the broadcast time period of the first program data, and (c) when the judging means judges that the time period from the last update time of the second additional data to the start of the broadcast time period of the first program data is no longer than the predetermined criterion time period, repeatedly multiplexes the second additional data and the first additional data with the second program data from the specific time to the start of the broadcast time period of the first program data so that a total bandwidth for the second additional data and the first additional data is allocated to the predetermined bandwidth and repeatedly multiplexes the first additional data with the first program data during the broadcast time period of the first program data.

22. The broadcast apparatus of claim 21, wherein, when the judging means judges that the time period from the last update time of the second additional data to the start of the broadcast time period of the first program data is no longer than the predetermined criterion time period, the multiplexing means repeatedly multiplexes the second additional data and the first additional data with the second program data during the time period from the last update time of the second additional data to the start of the broadcast time period of the first program data.

23. The broadcast apparatus of claim 21, further comprising:

criterion time period determining means for determining the predetermined criterion time period to be used by the judging means by multiplying a time period of a broadcast cycle of additional data by a predetermined coefficient.

24. The broadcast apparatus of claim 1, wherein the acquiring means further acquires second additional data corresponding to the second program data and a broadcast time period of the second program data, the second additional data is updated during the broadcast time period of the second program data, the broadcast apparatus further comprises judging means for judging whether a time period from a last update time of the second additional data to the start of the broadcast time period of the first program data is longer than a predetermined criterion time period, and the multiplexing means (a) repeatedly multiplexes the second additional data with the second program data until the specific time so that a bandwidth for the second additional data is allocated to a predetermined bandwidth, (b) when the judging means judges that the time period from the last update time of the second additional data to the start of the broadcast time period of the first program data is longer than the predetermined criterion time period, so that a bandwidth for the first additional data is allocated to the predetermined bandwidth, repeatedly multiplexes the first additional data with the second program data from the specific time to the start of the broadcast time period of the first program data and repeatedly multiplexes the first additional data with the first program data during the broadcast time period of the first program data, and (c) when the judging means judges that the time period from the last update time of the second additional data to the start of the broadcast time period of the first program data is no longer than the predetermined criterion time period, repeatedly multiplexes the second additional data and the first additional data with the second program data from the specific time to the start of the broadcast time period of the first program data so that a total bandwidth for the second additional data and the first additional data is increased by adding a bandwidth for the first additional data to the predetermined bandwidth and repeatedly multiplexes the first additional data with the first program data during the broadcast time period of the first program data so that a bandwidth for the first additional data is allocated to the predetermined bandwidth.

25. The broadcast apparatus of claim 24, wherein, when the judging means judges that the time period from the last update time of the second additional data to the start of the broadcast time period of the first program data is no longer than the predetermined criterion time period, the multiplexing means repeatedly multiplexes the second additional data and the first additional data with the second program data during the time period from the last update time of the second additional data to the start of the broadcast time period of the first program data.

26. The broadcast apparatus of claim 24, further comprising:

criterion time period determining means for determining the predetermined criterion time period to be used by the judging means by multiplying a time period of a broadcast cycle of additional data by a predetermined coefficient.

27. The broadcast apparatus of claim 1, wherein the acquiring means further acquires second additional data corresponding to the second! program data, the broadcast apparatus further comprises judging means for judging whether the broadcast time period is shorter than a predetermined criterion time period, and the multiplexing means, (a) when the judging means judges that the broadcast time period is shorter than the predetermined criterion time period, repeatedly multiplexes the second additional data with the second program data until the specific time, repeatedly multiplexes the first additional data with the second program data from the specific time to the start of the broadcast time period, and repeatedly multiplexes the first additional data with the first program data during the broadcast time period, and (b) when the judging means judges that the broadcast time period is no shorter than the predetermined criterion time period, repeatedly multiplexes the second additional data with the second program data until the start of the broadcast time period and repeatedly multiplexes the first additional data with the first program data during the broadcast time period.

28. The broadcast apparatus of claim 27 further comprising:

criterion time period determining means for determining the predetermined criterion time period to be used by the judging means by multiplying a time period of a broadcast cycle of additional data by a predetermined coefficient.

29. The broadcast apparatus of claim 1, wherein the acquiring means further acquires second additional data corresponding to the second program data, the first additional data is updated during the broadcast time period of the first program data, the broadcast apparatus further comprises judging means for judging whether a time period from the start of the broadcast time period to the first update time of the first additional data is longer than a predetermined criterion time period, and the multiplexing means, (a) when the judging means judges that the time period from the start of the broadcast time period to the first update time of the first additional data is shorter than the predetermined criterion time period, repeatedly multiplexes the second additional data with the second program data until the specific time, repeatedly multiplexes the first additional data with the second program data from the specific time to the start of the broadcast time period, and repeatedly multiplexes the first additional data with the first program data during the broadcast time period, and (b) when the judging means judges that the time period from the start of the broadcast time period to the first update time of the first additional data is no shorter than the predetermined criterion time period, repeatedly multiplexes the second additional data with the second program data until the start of the broadcast time period and repeatedly multiplexes the first additional data with the first program data during the broadcast time period.

30. The broadcast apparatus of claim 29 further comprising:

criterion time period determining means for determining the predetermined criterion time period to be used by the judging means by multiplying a time period of a broadcast cycle of additional data by a predetermined coefficient.

31. The broadcast apparatus of claim 1, wherein the acquiring means further acquires second additional data corresponding to the second program data, the broadcast apparatus has judgment information which indicates whether the multiplexing for the first addi tional data is to be started previous to the start of the broadcast time period, and the multiplexing means, (a) when the judgment information indicates that the multiplexing is to be started previously, repeatedly multiplexes the second additional data with the second program data until the specific time, repeatedly multiplexes the first additional data with the second program data from the specific time to the start of the broadcast time period, and repeatedly multiplexes the first additional data with the first program data during the broadcast time period, and (b) when the judgment information indicates that the multiplexing is not to be started previously, repeatedly multiplexes the second additional data with the second program data until the start of the broadcast time period and repeatedly multiplexes the first additional data with the first program data during the broadcast time period.

32. A broadcast apparatus for multiplexing and broadcasting program data which is to be reproduced by a reception apparatus soon after receipt and additional data corresponding to the program data, the broadcast apparatus comprising:

acquiring means for acquiring first program data, a first additional data group including at least first additional data corresponding to the first program data, a broadcast time period of the first program data, second program data to be broadcast before the first program data, second additional data corresponding to the second program data, and a broadcast time period of the second program data;

judging means for judging, for each of the broadcast time period of the first program data and the broadcast time period of the second program data, whether the broadcast time period is shorter than a predetermined criterion time period;

multiplexing means for, (a) in a first case where the broadcast time period of the first program data is shorter than the predetermined criterion time period and the broadcast time period of the second program data is no shorter, than the predetermined criterion time period, repeatedly multiplexing the second additional data with the second program data until a specific time, repeatedly multiplexing the first additional data group with the second program data from the specific time to a start of the broadcast time period of the first program data, and repeatedly multiplexing the first additional data group with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data group with the second program data from the specific time to the start of the broadcast time period of the first program data and repeatedly multiplexing the first additional data group with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data group with the first program data during the broadcast time period of the first program data; and broadcasting means for broadcasting the data multiplexed by the multiplexing means;

cache instruction broadcasting means for broadcasting a cache instruction before the start of the reproduction time period, the cache instruction instructing the reception apparatus to cache only the first additional data; and use instruction broadcasting means for broadcasting a use instruction after the start of the reproduction time period, the use instruction instructing the reception apparatus to use, when the first additional data has been cached according to the cache instruction, the cached additional data.

33. The broadcast apparatus of claim 32, wherein the multiplexing means (a) repeatedly multiplexes the second additional data with the second program data until the specific time so that a bandwidth for the second additional data is allocated to a predetermined bandwidth, (b) in the first case, repeatedly multiplexes the first additional data with the second program data from the specific time to the start of the broadcast time period of the first program data so that a bandwidth for the first additional data is allocated to the predetermined bandwidth, and (c) in the second case, repeatedly multiplexes the second additional data and the first additional data with the second program data from the specific time to the start of the broadcast time period of the first program data so that a total bandwidth for the first additional data and the first additional data is allocated to the predetermined bandwidth.

34. The broadcast apparatus of claim 32, wherein the multiplexing means (a) repeatedly multiplexes the second additional data with the second program data until the specific time so that a bandwidth for the second additional data is allocated to a predetermined bandwidth, (b) in the first case, repeatedly multiplexes the first additional data with the second program data from the specific time to the start of the broadcast time period of the first program data so that a bandwidth for the first additional data is allocated to the predetermined bandwidth, and (c) in the second case, repeatedly multiplexes the second additional data and the first additional data with the second program data from the specific time to the start of the broadcast time period of the first program data so that a total bandwidth for the first additional data and the first additional data is increased by adding a bandwidth for the first additional data to the predetermined bandwidth.

35. A broadcast apparatus for multiplexing and broadcasting program data which is to be reproduced by a reception apparatus soon after receipt and additional data which corresponds to the program data, the broadcast apparatus comprising:

acquiring means for acquiring first program data, a first additional data group including at least first additional data corresponding to the first program data, a broadcast time period of the first program data, second program data which is to be broadcast before the first program data, and second additional data corresponding to the second program data;

accepting means for accepting, from an outside, judgment on whether multiplexing for the first additional data group is to be started at a specific time or a start time of the broadcast time period, the specific time being a point in time before the start of the broadcast time period, and a time period between the specific time and the start of the broadcast time period being a predetermined time period;

multiplexing means for, (a) in a first case that the accepting means accepts judgment that the multiplexing for the first additional data group is to be started at the specific time, repeatedly multiplexing the second additional data with the second program data until the specific time, repeatedly multiplexing the first additional data group with the second program data from the specific time to the start of the broadcast time period, and repeatedly multiplexing the first additional data group with the first program data during the broadcast time period, and (b) in a second case that the accepting means accepts judgment that the multiplexing for the first additional data group is to be started at the start time, repeatedly multiplexing the second additional data with the second program data until the start of the broadcast time period, repeatedly multiplexing the first additional data group with the second program data from the specific time to a start of the broadcast time period of the first program data, and repeatedly multiplexing the first additional data group with the first program data during the broadcast time period;

broadcasting means for broadcasting the data multiplexed by the multiplexing means;

cache instruction broadcasting means for broadcasting a cache instruction before the start of the reproduction time period, the cache instruction instructing the reception apparatus to cache only the first additional data; and use instruction broadcasting means for broadcasting a use instruction after the start of the reproduction time period, the use instruction instructing the reception apparatus to use, when the first additional data has been cached according to the cache instruction, the cached additional data.

36. The broadcast apparatus of claim 35, wherein the multiplexing means (a) repeatedly multiplexes the second additional data with the second program data until the specific time so that a bandwidth for the second additional data is allocated to a predetermined bandwidth, and (b) in the first case, repeatedly multiplexes the first additional data with the second program data from the specific time to the start of the broadcast time period of the first program data so that a bandwidth for the first additional data is allocated to the predetermined bandwidth.

37. The broadcast apparatus of claim 36, wherein the accepting means further accepts, from the outside, an indication of the predetermined time period.

38. The broadcast apparatus of claim 35, wherein the accepting means further accepts, from the outside, an indication of the predetermined time period.

39. A broadcast apparatus for multiplexing and broadcasting program data which is to be reproduced by a reception apparatus soon after receipt and additional data which corresponds to the program data, the broadcast apparatus comprising:

acquiring means for acquiring first program data, a first additional data group including at least first additional data corresponding to the first program data, a broadcast time period of the first program data, second program data which is to be broadcast before the first program data, and second additional data corresponding to the second program data;

accepting means for accepting, from an outside, judgment on whether multiplexing for the second additional data is to be continued until the start of the broadcast time period;

multiplexing means for, (a) in a first case that the accepting means accepts judgment that the multiplexing for the second additional data is not to be continued until the start of the broadcast time period, repeatedly multiplexing the second additional data with the second program data until the specific time, repeatedly multiplexing the first additional data group with the second program data from the specific time to the start of the broadcast time period, and repeatedly multiplexing the first additional data group with the first program data during the broadcast time period, and (b) in a second case that the accepting means accepts judgment that multiplexing for the second additional data is to be continued until the start of the broadcast time period, repeatedly multiplexing the second additional data and the first additional data group with the second program data from the specific time to the start of the broadcast time period and repeatedly multiplexing the first additional data group with the first program data during the broadcast time period;

broadcasting means for broadcasting the data multiplexed by the multiplexing means;

cache instruction broadcasting means for broadcasting a cache instruction before the start of the reproduction time period, the cache instruction instructing the reception apparatus to cache only the first additional data; and use instruction broadcasting means for broadcasting a use instruction after the start of the reproduction time period, the use instruction instructing the reception apparatus to use, when the first additional data has been cached according to the cache instruction, the cached additional data.

40. The broadcast apparatus of claim 38, wherein the multiplexing means (a) repeatedly multiplexes the second additional data with the second program data until the specific time so that a bandwidth for the second additional data is allocated to a predetermined bandwidth, (b) in the first case, repeatedly multiplexes the first additional data with the second program data from the specific time to the start of the broadcast time period so that a bandwidth for the first additional data is allocated to the predetermined bandwidth, and (c) in the second case, repeatedly multiplexes the second additional data and the first additional data with the second program data from the specific time to the start of the broadcast time period so that a total bandwidth for the first additional data and the first additional data is increased by adding a bandwidth for the first additional data to the predetermined bandwidth.

41. The broadcast apparatus of claim 40, wherein the accepting means further accepts, from the outside, an indication of the predetermined time period.

42. The broadcast apparatus of claim 39, wherein the multiplexing means (a) repeatedly multiplexes the second additional data with the second program data until the specific time so that a bandwidth for the second additional data is allocated to a predetermined bandwidth, (b) in the first case, repeatedly multiplexes the first additional data with the second program data from the specific time to the start of the broadcast time period so that a bandwidth for the first additional data is allocated to the predetermined bandwidth, and (c) in the second case, repeatedly multiplexes the second additional data and the first additional data with the second program data from the specific time to the start of the broadcast time period so that a total bandwidth for the first additional data and the first additional data is increased by adding a bandwidth for the first additional data to the predetermined bandwidth.

43. The broadcast apparatus of claim 42, wherein the accepting means further accepts, from the outside, an indication of the predetermined time period.

44. The broadcast apparatus of claim 39, wherein the accepting means further accepts, from the outside, an indication of the predetermined time period.

45. A reception apparatus for receiving multiplexed data which is made up of program data which is to be reproduced by a reception apparatus soon after receipt and additional data which corresponds to the program data so that a total bandwidth is allocated to a predetermined bandwidth, the reception apparatus comprising:

receiving means for receiving first multiplexed data transmitted by (a) repetitively multiplexing, from a point of a predetermined time period before a start of a broadcast time period for first program data to an end of a broadcast time period for second program data, an additional data group including first additional data that corresponds to the first program data with the second program data, and (b) singly multiplexing, with the multiplexed additional data group and second program, a cache instruction instructing to cache only the first additional data, the second program data being reproduced before the first program data, and second multiplexed data transmitted by (a) repetitively multiplexing the first additional data group with the first program data, during the broadcast time period and (b) singly multiplexing a use instruction with the multiplexed first additional data group and first program data, the use instruction instructing to use, (i) when the first additional data has been cached, the cached first additional data, and (ii) when the first additional data has not been cached, the received first additional data;

reproducing means for reproducing the first program data of the first multiplexed data during the broadcast time period for the first program data;

caching means for caching, when the receiving means receives the first additional data of the first multiplexed data, the first additional data according to the cache instruction; and using means for using, according to the use instruction during the broadcast time period, (a) when the first additional data has been cached, the cashed first additional data, and (b) when the first additional data has not been cached, the first additional data of the second multiplexed data.

46. The reception apparatus of claim 45, wherein the receiving means further receives a cache instruction to cache the first additional data when the first additional data has been stored in a predetermined storage medium before the start of the broadcast time period and a use instruction to use, during the broadcast time period, (a) when the first additional data has been stored in the cache memory, the first additional data stored in the cache memory and (b) when the first additional data has not been stored in the cache memory, the first additional data received by the receiving means or the first additional data stored in the predetermined storage medium, the caching means stores only the first additional data into the cache memory before the start of the broadcast time period, according to the cache instruction, and the using means uses, during the broadcast time period, (a) when the first additional data has been stored in the cache memory, the first additional data stored in the cache memory, and (b) when the first additional data is not stored in the cache memory, the first additional data stored in the predetermined storage medium or the first additional data received by the receiving means, according to the use instruction.

47. A broadcast method for multiplexing and broadcasting program data which is to be reproduced by a reception apparatus soon after receipt and additional data which corresponds to the program data, the broadcast method comprising:

an acquiring step for acquiring first program data, a first additional data group including at least first additional data corresponding to the first program data, a broadcast time period of the first program data, and second program data which is to be broadcast before the first program data;

a multiplexing step for repeatedly multiplexing the first additional data group with the second program data from a specific time to a start of the broadcast time period and repeatedly multiplexing the first additional data group with the first program data during the broadcast time period, the specific time being a point in time before the start of the broadcast time period, and a time period between the specific time and the start of the broadcast time period being a predetermined time period;

a broadcasting step for broadcasting the data multiplexed in the multiplexing step;

cache instruction broadcasting step for broadcasting a cache instruction before the start of the reproduction time period, the cache instruction instructing the reception apparatus to cache only the first additional data;

use instruction broadcasting step for broadcasting a use instruction after the start of the reproduction time period, the use instruction instructing the reception apparatus to use, when the first additional data has been cached according to the cache instruction, the cached additional data and a displaying step for displaying the first additional data.

48. A broadcast method for multiplexing and broadcasting program data which is to be reproduced by a reception apparatus soon after receipt and additional data corresponding to the program data, the broadcast method comprising:

an acquiring step for acquiring first program data, a first additional data group including at least first additional data corresponding to the first program data, a broadcast time period of the first program data, second program data to be broadcast before the first program data, second additional data corresponding to the second program data, and a broadcast time period of the second program data;

a judging step for judging, for each of the broadcast time period of the first program data and the broadcast time period of the second program data, whether the broadcast time period is shorter than a predetermined criterion time period;

a multiplexing step for, (a) in a first case where the broadcast time period of the first program data is shorter than the predetermined criterion time period and the broadcast time period of the second program data is no shorter than the predetermined criterion time period, repeatedly multiplexing the second additional data with the second program data until a specific time, repeatedly multiplexing the first additional data group with the second program data from the specific time to a start of the broadcast time period of the first program data, and repeatedly multiplexing the first additional data group with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data group with the second program data from the specific time to the start of the broadcast time period of the first program data and repeatedly multiplexing the first additional data group with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data with the first program data during the broadcast time period of the first program data; and a broadcasting step for broadcasting the data multiplexed in the multiplexing step;

cache instruction broadcasting step for broadcasting a cache instruction before the start of the reproduction time period, the cache instruction instructing the reception apparatus to cache only the first additional data;

use instruction broadcasting step for broadcasting a use instruction after the start of the reproduction time period, the use instruction instructing the reception apparatus to use, when the first additional data has been cached according to the cache instruction, the cached additional data and a displaying step for displaying the first additional data.

49. A broadcast method for receiving multiplexed data which is made up of program data which is to be reproduced by a reception apparatus soon after receipt and additional data which corresponds to the program data so that a total bandwidth is allocated to a predetermined bandwidth, the reception method comprising:

a receiving step for receiving first multiplexed data transmitted by (a) repetitively multiplexing, from a predetermined time period before a start of a broadcast time period for first program data to an end of a broadcast time period for second program data, an additional data group including first additional data that corresponds to the first program data with the second program data, and (b) singly multiplexing, with the multiplexed additional data group and second program, a cache instruction instructing to cache only the first additional data, the second program data being reproduced before the first program data, and second multiplexed data transmitted by (a) repetitively multiplexing the first additional data group with the first program data, during the broadcast time period and (b) singly multiplexing a use instruction with the multiplexed first additional data group and first program data, the use instruction instructing to use, (i) when the first additional data has been cached, the cached first additional data, and (ii) when the first additional data has not been cached, the received first additional data;

a reproducing step for reproducing the first program data of the first multiplexed data during the broadcast time period for the first program data;

a caching step for caching, when the receiving step receives the first additional data of the first multiplexed data, the first additional data according to the cache instruction;

a using step for using, according to the use instruction during the broadcast time period, (a) when the first additional data has been cached, the cashed first additional data, and (b) when the first additional data has not been cached, the first additional data of the second multiplexed data and a displaying step for displaying the first additional data.

50. A computer-readable medium encoded with computer executable instructions being executed by a computer to perform multiplexing and broadcasting program data which is to be reproduced by a reception apparatus:

an acquiring step for acquiring first program data, a first additional data group including at least first additional data corresponding to the first program data, a broadcast time period of the first program data, and second program data which is to be broadcast before the first program data;

a multiplexing step for repeatedly multiplexing the first additional data group with the second program data from a specific time to a start of the broadcast time period and repeatedly multiplexing the first additional data group with the first program data during the broadcast time period, the specific time being a point in time before the start of the broadcast time period, and a time period between the specific time and the start of the broadcast time period being a predetermined time period;

a broadcasting step for broadcasting the data multiplexed in the multiplexing step;

cache instruction broadcasting step for broadcasting a cache instruction before the start of the reproduction time period, the cache instruction instructing the reception apparatus to cache only the first additional data; and use instruction broadcasting step for broadcasting a use instruction after the start of the reproduction time period, the use instruction instructing the reception apparatus to use, when the first additional data has been cached according to the cache instruction, the cached additional data.

51. A computer-readable medium encoded with computer executable instructions being executed by a computer to perform multiplexing and broadcasting program data which is to be reproduced by a reception apparatus:

an acquiring step for acquiring first program data, a first additional data group including at least first additional data corresponding to the first program data, a broadcast time period of the first program data, second program data to be broadcast before the first program data, second additional data corresponding to the second program data, and a broadcast time period of the second program data;

a judging step for judging, for each of the broadcast time period of the first program data and the broadcast time period of the second program data, whether the broadcast time period is shorter than a predetermined criterion time period;

a multiplexing step for, (a) in a first case where the broadcast time period of the first program data is shorter than the predetermined criterion time period and the broadcast time period of the second program data is no shorter than the predetermined criterion time period, repeatedly multiplexing the second additional data group with the second program data until a specific time, repeatedly multiplexing the first additional data group with the second program data from the specific time to a start of the broadcast time period of the first program data, and repeatedly multiplexing the first additional data with the first program data during the broadcast time period of the first program data, the specific time being a point in time before the start of the broadcast time period of the first program data, and a time period between the specific time and the start of the broadcast time period of the first program data being a predetermined time period, (b) in a second case where the broadcast time period of the first program data and the broadcast time period of the second program data are each shorter than the predetermined criterion time period, repeatedly multiplexing the second additional data and the first additional data group with the second program data from the specific time to the start of the broadcast time period of the first program data and repeatedly multiplexing the first additional data group with the first program data during the broadcast time period of the first program data, and (c) in a third case where the broadcast time period of the first program data is no shorter than the predetermined criterion time period, regardless of whether the broadcast time period of the second program data is shorter than the predetermined criterion time period, repeatedly multiplexing the second additional data with the second program data until the start of the broadcast time period of the first program data and repeatedly multiplexing the first additional data with the first program data during the broadcast time period of the first program data; and a broadcasting step for broadcasting the data multiplexed in the multiplexing step;

cache instruction broadcasting step for broadcasting a cache instruction before the start of the reproduction time period, the cache instruction instructing the reception apparatus to cache only the first additional data; and use instruction broadcasting step for broadcasting a use instruction after the start of the reproduction time period, the use instruction instructing the reception apparatus to use, when the first additional data has been cached according to the cache instruction, the cached additional data.

52. A computer-readable medium encoded with computer executable instructions being executed by a computer to perform a receiving step for receiving first multiplexed data transmitted by (a) repetitively multiplexing, from a predetermined time period before a start of a broadcast time period for first program data to an end of a broadcast time period for second program data, an additional data group including first additional data that corresponds to the first program data with the second program data, and (b) singly multiplexing, with the multiplexed additional data group and second program, a cache instruction instructing to cache only the first additional data, the second program data being reproduced before the first program data, and second multiplexed data transmitted by (a) repetitively multiplexing the first additional data group with the first program data, during the broadcast time period and (b) singly multiplexing a use instruction with the multiplexed first additional data group and first program data, the use instruction instructing to use, (i) when the first additional data has been cached, the cached first additional data, and (ii) when the first additional data has not been cached, the received first additional data;

a reproducing step for reproducing the first program data of the first multiplexed data during the broadcast time period for the first program data;

a caching step for caching, when the receiving step receives the first additional data of the first multiplexed data, the first additional data according to the cache instruction; and a using step for using, according to the use instruction during the broadcast time period, (a) when the first additional data has been cached, the cashed first additional data, and (b) when the first additional data has not been cached, the first additional data of the second multiplexed data.

* * * * *

UNITED STATES PATENT AND TRADEMARK OFFICE

CERTIFICATE OF CORRECTION

PATENT NO. : 7,254,826 B2
APPLICATION NO. : 09/897222
DATED : August 7, 2007
INVENTOR(S) : Mori et al.

It is certified that error appears in the above-identified patent and that said Letters Patent is hereby corrected as shown below:

In the Claims:
Column 43, Claim 27, line 61, “second!” should be --second--;
Column 48, Claim 40, line 51, “38” should be --39--;
Column 52, Claim 49, line 34 “cashed” should be --cached--.

Signed and Sealed this

Third Day of June, 2008

JON W. DUDAS
*Director of the United States Patent and Trademark Office*